United States Patent
Stiefel

(10) Patent No.: US 10,755,329 B1
(45) Date of Patent: Aug. 25, 2020

(54) SYSTEM AND METHOD FOR AUTOMATED DISTILLERY MANAGEMENT

(71) Applicant: Justin B. Stiefel, Gig Harbor, WA (US)

(72) Inventor: Justin B. Stiefel, Gig Harbor, WA (US)

(73) Assignee: Heritage Distilling Company, Inc., Gig Harbor, WA (US)

( * ) Notice: Subject to any disclaimer, the term of this patent is extended or adjusted under 35 U.S.C. 154(b) by 0 days.

(21) Appl. No.: 13/750,925

(22) Filed: Jan. 25, 2013

Related U.S. Application Data

(60) Provisional application No. 61/591,243, filed on Jan. 26, 2012.

(51) Int. Cl.
    *G09B 19/00* (2006.01)
    *G06Q 30/06* (2012.01)

(52) U.S. Cl.
    CPC ......... *G06Q 30/0621* (2013.01); *G09B 19/00* (2013.01)

(58) Field of Classification Search
    CPC ....................................................... C12G 1/00
    USPC ..... 434/127; 705/14.66, 26.5; 99/275, 277.1
    See application file for complete search history.

(56) References Cited

U.S. PATENT DOCUMENTS

| | | | |
|---|---|---|---|
| 4,487,785 A * | 12/1984 | Epchtein ................. | C12G 1/02 426/15 |
| 8,249,946 B2 | 8/2012 | Froseth et al. ............... | 705/26.5 |
| 2003/0177910 A1 * | 9/2003 | Lu ........................ | B01D 1/0017 99/276 |
| 2004/0202757 A1 * | 10/2004 | Gutwein et al. .............. | 426/433 |
| 2007/0248730 A1 * | 10/2007 | Wood .................... | B01D 3/004 426/494 |
| 2007/0255623 A1 * | 11/2007 | Firer et al. ...................... | 705/15 |
| 2008/0027820 A1 * | 1/2008 | Brill ............................... | 705/26 |
| 2008/0133318 A1 * | 6/2008 | Ramamurti ..................... | 705/10 |
| 2010/0076872 A1 * | 3/2010 | Nakamura ...................... | 705/28 |
| 2011/0153614 A1 * | 6/2011 | Solomon ........................ | 707/740 |

* cited by examiner

*Primary Examiner* — Bruk A Gebremichael
(74) *Attorney, Agent, or Firm* — Sheppard Mullin Richter & Hampton LLP

(57) ABSTRACT

A system and method for automated distillery management includes the ability to manage customers, manage inventory, and facilitate the production, aging, and sale of customized spirits. Customers, groups, and distillery staff may engage in the production, aging, and storage of customized spirits on a micro-brewing and/or micro-distilling scale. Various levels of customization may be available when producing the customized spirit. A level of customization of a spirit may be based upon type of spirit, recipe selection, amount of involvement in production process, type of involvement in production process, amount of notifications provided, types of notifications provided, participation in tasting during production process, spirit proof, aging type and time, storage time, customized labels for one or more casks, tanks, bottles, and/or other receptacles to hold the customized spirit and/or other factors related to producing a customized spirit. Customers and groups may also age and store spirits at the distillery storage site.

21 Claims, 7 Drawing Sheets

SYSTEM AND METHOD FOR AUTOMATED DISTILLERY MANAGEMENT

CROSS-REFERENCE TO RELATED APPLICATIONS

This application claims the benefit of U.S. Provisional Patent Application Ser. No. 61/591,243, entitled "Method for Producing, Aging, and Selling Customized Distilled Spirits and Other Products and Services," filed Jan. 26, 2012, the contents of which are hereby incorporated by reference in their entirety.

FIELD OF THE INVENTION

The invention relates to a system and method for automated distillery management including the ability to manage customers, manage inventory, and facilitate the production, aging, and sale of customized spirits.

BACKGROUND OF THE INVENTION

Generally speaking, the production of spirits, including, for example, vodka, whiskey, gin, and/or other spirits, is conducted by licensed distilleries. Individuals employed by a distillery may host customers for a visit, provide tastings of various spirits, and handle a sale of spirits from the distillery. Individuals employed by the distillery may also provide education about spirits available through the distillery and about the processes by which various spirits are made. The distillery may also have on-site storage at which customers may store their casks, tanks, bottles, and/or other receptacles of spirits for aging alongside the distillery's batches of spirits.

Conventional automated distillery management tools may exist, but have various limitations and drawbacks. For example, conventional automated distillery management tools may be limited to inventory management and/or customer account management. These and other drawbacks exist.

SUMMARY OF THE INVENTION

The disclosure relates to a system and method for automated distillery management, including the ability to manage customers, manage inventory, and facilitate the production, aging, and sale of customized spirits. The distillery may produce various spirits using its own recipes and machinery for commercial and/or other purposes. The types of spirits produced by the distillery may include for example, whiskey, gin, vodka, beer, wine, hard cider, ale, and/or other fermented drinks. Further, various participants such as customers, groups, distillery staff, and others may engage in the production, aging, and storage of customized spirits on a micro-scale. For example, customers, groups, and/or others may visit the distillery and participate in the production of a batch of customized spirit. The batch of customized spirit may comprise, for example, one or more casks, tanks, bottles, and/or other receptacles of a specific type of customized spirit. Customers may be individuals or families that would like to produce a customized spirit. A group may be an organization, company, and/or other entity that comprises one or more customers as group members, where the group may produce one or more customized spirits.

Various levels of customization may be available when producing a customized spirit. A level of customization may comprise, for example, one or more types of participation related to production of the customized spirit. The types of participation may comprise one or more of: selection of the type of spirit to be produced, selection of an amount of time the customized spirit is aged, participation in recipe creation, participation in tasting the spirit during production, notification of one or more actions to be taken during production of the customized spirit, provision of input regarding one or more actions to be taken during production of the customized spirit, and/or other types of participation. For example, a level of customization associated with a spirit may be based upon type of spirit, recipe selection, amount of involvement in production process, type of involvement in production process, amount of notifications provided, types of notifications provided, participation in tasting during production process, spirit proof, aging time, storage time, customized labels for one or more casks, tanks, bottles, and/or other receptacles to hold the customized spirit, customized labels to be applied to the bottles of finished spirits and/or other factors related to producing a customized spirit.

Customers, groups, and/or others that participate in producing a customized spirit may also age and store the spirit at the distillery storage site, for example, at the distillery's bonded or non-bonded space. The distillery management system may facilitate the production, aging, and storage of a customized spirit, manage customers, manage inventory, and/or perform other functionality related to managing a distillery.

A system for automated distillery management may comprise a computing device including a physical processor configured to perform some or all of a functionality of a plurality of modules. In some implementations, the computing device may comprise a non-transitory, tangible computer-readable storage medium with an executable program stored thereon, wherein the program instructs a microprocessor to perform some or all of the functionality of the plurality of modules. The plurality of modules may include, for example, a customer management module, a calendar management module, a role-based permissions module, a group management module, a customization module, an education module, a batch management module, an inventory management module, a transaction management module, a reporting module, a storage module, and/or other modules. A customer, group, and/or other entity may access the distillery management system via, for example, one or more interfaces (e.g., web pages) communicated from the computing device to a client device, an application such as a mobile application executing on a client device that generates the interface based on information communicated from the computing device, an agent running on the computing device, and/or via other interfaces.

The customer management module may be configured to allow a customer or other participant to register with the system, to maintain profile information for customers, and/or perform other functionality related to customer management. The calendar management module may be configured to facilitate scheduling of customer visits, scheduling of group visits, maintain a calendar for the distillery, provide invitations based on schedules, and/or perform other functionality related to managing a calendar for the distillery. The role-based permission module may facilitate system-based, batch-based, and group-based role management, with a role being associated with system-level access, batch-level access, group-level access and/or other access to distillery content. The group management module may facilitate registration of a group including one or more customers as group members, and/or perform other functionality related to group management. The customization module may be configured to accept a customization request, maintain an electronic forum for customers, groups, and/or other entities to communicate, and/or provide other functionality related to producing customized spirits. The education module may be configured to provide education related to production of different types of spirits, customization of spirits, available levels of customization for different types of spirits, timelines for producing different types of spirits, and/or other information regarding spirits and/or the production of spirits. The batch management module may be configured to provide information regarding recipe preparation and processing operations for the customized spirit to be produced, to receive sensory information from the distillery, to recommend changes in production conditions, to recommend progressing to a next processing operation, to notify customers regarding processing of the customized spirit, and/or perform other functionality related to managing the production of a batch of customized spirit. The inventory management module may be configured to associate one or more casks, tanks, bottles, and/or other receptacles of a batch of customized spirit with the appropriate customer, to determine where in distillery storage to store one or more casks, tanks, bottles, and/or other receptacles, to maintain status information about one or more casks, tanks, bottles, and/or other receptacles, to maintain status information about one or more batches, and/or to perform other functionality related to managing the inventory at the distillery. The transaction management module may be configured to track transactions relating to customers, groups, and/or other entities, transactions related to the sale of spirits, transactions related to the storage of spirits, and/or other transactions related to the distillery. The storage module may be configured to store information related to system usage, customer information, and/or distillery content. The reporting module may be configured to facilitate analysis and report information related to system usage, customer information, and/or distillery content.

The customer management module may be configured to allow a customer or other participant to register with the system, to maintain profile information for customers, and/or perform other functionality related to customer management. In some implementations, the customer management module may comprise a customer registration module and/or other modules. The customer registration module may be configured to accept and store profile information for a customer. The customer management module may also maintain and update profile information for a customer. For example, the customer management module may update a customer profile based on customer interaction with the distillery, customer interaction with the distillery management system, processing by one or more modules of the distillery management system, data received, obtained, derived, associated with, or provided via one or more modules of the distillery management system, and/or other information related to the customer.

In some implementations, the customer registration module of the customer management module may be configured to accept and store profile information for a customer. A customer may be an individual, family, group member, and/or other customer that would like to produce a customized spirit. The profile may include information related to the customer including, for example, customer identifier (e.g., a unique combination of letters, numbers, and/or other characters that may be identify the customer), name(s), age(s), address, telephone number, email, preferred mode of contact, preferred type(s) of spirits, customization requests, associated recipes, associated groups, associated batches, associated inventory, distillery visit history, education received (e.g., via a kiosk at the distillery, an app installed on a client computing device, an app installed on a distillery computing device of the licensed distillery, a website or portal associated with the distillery, distillery staff, and/or other source), secure identification (e.g., username, password, and/or other secure identification items), transaction history, and/or other information that may be associated with the customer.

In some implementations, the calendar management module may be configured to facilitate scheduling of customer visits, facilitate scheduling of group visits, maintain a calendar for the distillery, provide invitations based on schedules, and/or perform other functionality related to managing a calendar for the distillery. For example, the calendar management module may maintain a calendar for the distillery. The calendar may include information related to, for example, scheduled customer visits, scheduled group visits, scheduled tours, scheduled tasting, events held by the distillery, scheduled days on which specific customized spirits are available to be produced, and/or other calendar information related to customers at the distillery. In some implementations, calendar information may also maintain information related to one or more production schedules for customized spirits, dates at which notifications are to be sent to customers, groups, and/or other entities, dates at which invitations to events are to be sent to customers, groups, and/or other entities, one or more production schedules for distillery spirits, and/or other calendar information related to internal management at the distillery. The calendar management module may also accept and store appointment information related to customer visits and/or group visits for the distillery. In some implementations, the appointment information may include, for example, names of the customers, groups, and/or entities visiting the distillery, purpose of visit, date of visit, time of visit, length of visit, associated transactions, associated inventory, potential sales, potential transactions, and/or other information related to the visit. The calendar management module may update the calendar based upon the appointment information received from a customer, a group, and/or other entity interested in visiting the distillery. The calendar management module may provide invitations to a customer, group, and/or other entity based on schedules stored at the distillery calendar. For example, the calendar management module may provide an invitation to a customer based on a tasting that the customer is schedule to attend according to a customization level associated with customized spirits of the customer.

The role-based permission module may be configured to tailor a customer's access to the system based on one or more roles associated with the customer. In some implementations, the role-based permission module may be configured to tailor a group's access to the system based on one or more roles associated with the group. The one or more roles may include system-level roles, batch-based roles and/or group-based roles.

System-level roles may grant access to various system features such as for example, access to one or more modules, access to distillery content stored at a storage module, and/or other access to system features. Distillery content may include information related to customers, groups, batches, inventory, transactions, and/or other information related to the distillery. Different system-level roles may be granted that provide access to different system features. For example, a distillery administrator may be able to access some or all information stored at the storage module, while a customer may be able to access some or all information stored at the storage module and related to the customer.

Batch-level roles may grant access to batch information related to a specific batch. Batch information may include, for example, information relating to how the batch is made, the recipe for the batch, potential changes available to the recipe for the batch, the processing status of the batch, the proof of the batch, the aging process of the batch, an amount that the batch has been (or will be) aged, one or more parameters related to how the batch is processed, changes made to the batch, environmental conditions associated with the batch, changes to environmental conditions associated with the batch, and/or other information related to the batch. Different batch-based roles may be granted that provide access to different batch information, facilitate the receipt of input related to batch processing, and/or provide other access to the batch. The access provided by a batch-level role may depend, for example, upon a level of customization related to the customized spirit associated with the batch and/or a system-role.

Group-based roles may grant access to various system features such as for example, access to one or more modules, access to distillery content stored at a storage module, access to batch information stored at a storage module, and/or other access to system features. Different group-level roles may be granted that provide access to different system features. For example, a group administrator may have different access to distillery information and/or batch information than a group member.

The role-based permissions module may maintain a plurality of roles, including, for example, distillery administrator, distillery staff, customer, group administrator, group member, and/or other roles. A customer registered with the system may access the system using one or more roles. For example, the access available to a customer may be based on various ones of the customer's system-level roles, batch-based roles, and/or group-based roles.

The group management module may facilitate registration of a group including one or more customers. For example, the group management module may accept and store profile information for a group. A group may be a company, family, group of friends, organization, and/or other entity. The profile information for a group may include, for example, a group identifier (e.g., a unique combination of letters, numbers, and/or other characters that may be identify the group), customers in group (e.g., identified by customer identifier), group address, group telephone number, group point of contact, company name, entity name, maximum number of group members, preferred mode of communication, preferred group member(s) to contact, preferred type(s) of spirits, customization requests, recipes associated with the group, other groups associated with the group, batches associated with the group, inventory associated with the group, distillery visit history, education received by the group (e.g., via a kiosk at the distillery, an app installed on a client computing device, an app installed on a distillery computing device of the distillery, a website or portal associated with the distillery, distillery staff, and/or other source), secure identification for the group (e.g., username, password, and/or other secure identification items), transaction history associated with the group, and/or other information related to a group. When registering a group, the group management module may determine whether the one or more group members in the group are already registered as customers with the distillery management system. When a group member in the group has not yet registered as a customer with the distillery management system, the group management module may register the group member as a customer in a manner similar to the customer registration module of the customer management module.

The group management module may associate the customers in the group with the group. For example, the group management module may associate a customer identifier associated with the customer with the group identifier. The group management module may update profile information for a customer in the group to indicate the group association. In some implementations, the customer management module may perform same or similar functionality as the group management module.

The customization module may be configured to accept a customization request, maintain an electronic forum for customers, groups, and/or other entities to communicate, and/or provide other functionality related to producing customized spirits. The customization request may include, for example, customer name(s), group name(s), number of casks, tanks, bottles, and/or other receptacles, type of spirit, recipe associated with spirit, level of customization, and/or other information related to producing a customized spirit. The customization module may be configured to accept a customization request via, for example, a kiosk at the distillery, an app installed on a client computing device, an app installed on a distillery computing device of the distillery, a website or portal associated with the distillery, via one or more staff members of the distillery, and/or by other methods. The customization module may be configured to determine whether the one or more customers and/or one or more groups associated with the customization request are registered with the distillery management system. When the customization module determines that one or more customers, groups, and/or other entities are not registered with the distillery management system, the customization module may accept and store profile information for the one or more customers and/or one or more groups in a manner similar to the customer registration module of the customer management module.

In some implementations, the customization module may also maintain an electronic forum for customers, groups, and/or other entities registered with the distillery management system. The forum may be maintained, for example, via a portal, web site, and/or other communication media. In some implementations, the customization module may facilitate the sharing of information via the forum. The information shared by customers, groups, and/or other entities may include, for example, recipes for producing customized spirits, tweaks to operations involved in producing customized spirits, photos, videos, notes and/or other materials related to producing customized spirits, ratings associated with different inputs provided during the production of a customized spirit, ratings associated with recipes for a type of spirit, ratings associated with different levels of customization, reviews associated with different inputs provided during the production of a customized spirit, reviews associated with recipes for a type of spirit, reviews associated with different levels of customization, and/or other information that a customer, group, and/or other entity may want to share via the forum. The customization module may also facilitate the sharing of information of the forum via email, text, TWEET, blog post, social media post, and/or by other methods by which information may be shared. In some implementations, the customization module may also facilitate instant messaging, group chats, video chats, and/or other methods of communication via the forum.

The education module may be configured to provide education related to production of different types of spirits, customization of spirits, available levels of customization for different types of spirits, timelines for producing different types of spirits, and/or other information regarding spirits and/or the production of spirits. In some implementations, the education module may provide education via one or more kiosks located at the distillery. For example, the education module may facilitate the viewing of one or more videos related to different topics, may play videos that play on a repeated loop, may facilitate interaction with an application available at the kiosk, and/or may provide the information in other ways via the one or more kiosks. In some implementations, the education module may provide education via an application that may be downloaded to a client device, accessed via a mobile client device associated with the distillery, and/or accessed in other ways. The education module may facilitate customer interaction with the devices via which the education is provided, may include multimedia content, may facilitate the sharing of information provided (e.g., via email, text, TWEET, blog post, social media post, and/or by other methods by which information may be shared), and/or may provide other functionality related to providing education regarding spirits and/or the production of spirits.

In some implementations, the education module may provide location-based education. For example, the education module may be configured to obtain location data via, for example, a device via which the education is provided. Based on a location of the device (e.g., inside the distillery, at a tasting room associated with the distillery, at a kiosk at the distillery, in a particular section of the distillery storage, at a particular section of the distillery that handles a certain type of processing, and/or other locations related to the distillery), the education module may provide information related to activities that may occur at and/or near the location. For example, the education module may facilitate a walking tour of the distillery. In some implementations, the education module may provide a map of the distillery for viewing and interaction. For example, the education module may provide information about a specific location or processes that occur at a specific location in response to a user's interaction with that location on the map. An interaction may be determined, for example, by contact with the location on the map (e.g., as provided via a computing device running an application, via a kiosk, and/or via other methods of communicating the information), by voice recognition of a user naming a location tagged on the map, by spatial recognition of a user's gaze, and/or other interaction with the map.

In some implementations, the education module may be configured to provide customized education to a customer, group, and/or other entity based upon a level of customization associated with a customized spirit of that customer, group, and/or other entity. For example, the education module may be configured to provide information about various kinds of user input available for an operation during production of the customized spirit, where an associated level of customization allows user input during that operation. For example, the education module may be configured to provide various recipes for making a type of spirit.

In some implementations, the education module may be configured to access information provided by the distillery staff, information provided by customers, groups, and/or other entities that have produced customized spirits, information available on the internet or other publicly available networks, and/or other information. The information provided by customers, groups, and/or other entities may include, for example, information provided via the customization module. For example, the information provided by customers, groups, and/or other entities may include, for example, ratings associated with different inputs provided during the production of a customized spirit, ratings associated with recipes for a type of spirit, ratings associated with different levels of customization, reviews associated with different inputs provided during the production of a customized spirit, reviews associated with recipes for a type of spirit, reviews associated with different levels of customization, information shared by customers, groups, and/or other entities, and/or other information provided by customers, groups, and/or other entities.

The batch management module may be configured to provide information regarding recipe preparation and processing operations for the customized spirit to be produced, to receive sensory information from the distillery, to recommend changes in production conditions, to recommend progressing to a next processing operation, to notify customers, groups, and/or other entities regarding processing of the customized spirit, and/or perform other functionality related to managing the production of a batch of customized spirits. In some implementations, the batch management module may comprise one or more modules, including, for example, a processing module, a notification module, and/or other modules. The processing module may provide information regarding the operations for producing a customized spirit, may monitor the processing of the customized spirit, and may provide recommendations regarding actions to be taken regarding the processing of the customized spirit to the system, the distillery staff, the customer, group and/or other entities associated with producing the customized spirit, and/or may perform other functionality related to the processing of the customized spirit. The notification module may monitor the processing of the customized spirit, may send notifications to the customer and/or group based upon a level of customization associated with the customized spirit, and/or may perform other functionality related to notifying the customer and/or group related to the processing of the customized spirit.

The processing module may be configured to provide information regarding the operations for producing a customized spirit, may monitor the processing of the customized spirit, may provide recommendations regarding actions to be taken regarding the processing of the customized spirit to the system, the distillery staff, the customer, group and/or other entities associated with producing the customized spirit, may provide recommendations regarding actions to be taken regarding the processing of the customized spirit to the system, the distillery staff, the customer, group and/or other entities associated with producing the customized spirit, and/or may perform other functionality related to the processing of the customized spirit.

The processing module may be configured to provide instructions regarding recipe preparation and processing operations for the customized spirit to be produced. For example, the processing module may be configured to provide instructions via one or more kiosks located at the distillery, via an application that may be downloaded to a client device, via an application that may be accessed using a portable client device associated with the distillery, via email, via automated phone call, and/or via other communication media. The processing module may facilitate customer interaction with the devices via which the instructions are provided, may include multimedia content, may facilitate the sharing of information provided (e.g., via email, text, TWEET, blog post, social media post, and/or by other methods by which information may be shared), and/or may provide other functionality related to providing instructions regarding recipe preparation and processing operations for the customized spirit to be produced.

In some implementations, the instructions provided may depend upon the type of customized spirit being produced. For example, different recipes may be available for use with different types of spirits. In another example, one or more operations for producing the customized spirit may be tweaked or changed for different types of spirits. Operations involved in producing a customized spirit may include, for example, recipe creation, fermentation, enzyme usage, yeast selection, steam pumping, selection of type and amount of heat sourced used, type of still equipment used, distillation, selection of batch or continuous method, selection of number of times of distillation, or selection of number of times of redistillation, selection of reflux ratio, selection of the number and types of plates used in a tower configuration, selection of the type of metal used in the still (such as stainless steel or copper), concentration, condensation, head receipt, heart receipt, tail receipt, blending, proofing, filtering, infusion, aging, selection of type of cask used for aging (if any), and/or other operations involved in producing the customized spirit.

In some implementations, the instructions provided may depend upon the level of customization associated with the customized spirit. For example, the instructions may include information related to different recipes that could be used to produce the customized spirit, when the level of customization includes the ability to tweak the recipe used for the spirit. In another example, the instructions may include potential options for inputs during an operation for production, consequences of the input choices, the most popular input choice, the most used input choice, and/or other information related to inputs when the level of customization includes an ability to provide input related to the operation. The information provided in the instructions may be customized in other ways as well and is not limited to the examples provided herein.

In some implementations, the instructions may comprise, for example, text, photos, videos, multimedia content, and/or other information related to producing the customized spirit. For example, the instructions may comprise, for an operation, a before picture, an after picture, text relating to what should be done for the operation, video showing how to perform functionality needed for the operation, and/or other instructions related to the operation. In some implementations, the processing module may provide instructions at or near a time and/or location at which the instructions may be used. For example, instructions relating to creating the recipe for the customized spirit may be provided at the distillery a predetermined time before the customer, group, and/or other entity is ready to mix or is mixing the recipe for the customized spirit. In another example, instructions related to providing input to an operation may be provided a predetermined time before the operation is scheduled to begin. The predetermined time may depend upon the type of input needed, the length of the operation, the length of the previous operation, the method by which input may be provided (e.g., whether the customer, group, and/or other entity needs to travel to the distillery to provide input), and/or other factors relating to receiving the input in a timely manner.

In some implementations, the processing module may be configured to receive sensor information from the distillery. For example, one or more sensors may be placed at the distillery and/or the distillery storage. The sensors may comprise one or more types of sensors including, for example, temperature sensors, humidity sensors, pressure sensors, flow sensors, alcohol sensors, and/or sensors. The processing module may be configured to receive sensor information from the sensors placed at the distillery and/or distillery storage. For example, the processing module may be configured to receive the sensor information through wired and/or wireless channels. The sensors may be placed at one or more sections of the distillery and/or distillery storage, may be placed at one or more positions at one or more casks, tanks, bottles, and/or other receptacles, may be placed spaced apart on each row of cask, tank, bottle, and/or other receptacle storage at the distillery storage, and/or may be placed at other locations of the distillery and/or distillery storage. Different types of sensors and/or different combinations of types of sensors may be placed at different locations of the distillery and/or distillery storage. For example, different combinations of types of sensors may be placed at different locations based upon the information to be sensed at the respective locations.

In some implementations, the processing module may use the sensor information received from the one or more sensors to determine whether action is recommended to occur relating to the production of the customized spirit. For example, the processing module may determine whether other action is recommended to occur based on sensor information and information stored at the storage module related to producing the customized spirit. In some implementations, the processing module may use the sensor information to determine whether an environmental condition is recommended to be changed based on whether the sensor information sensed by one or more sensors is outside an acceptable range of values. The processing module may determine that a next operation in production of the customized spirit is recommended to begin based on sensor information and conditions stored at the storage module relating to the operations involved in producing the customized spirit. For example, based on a comparison of the sensor information received and conditions stored at the storage module, the processing module may determine that a next operation is recommended. In some implementations, when action is recommended to occur, the processing module and/or the education module may provide information related to the action and related to how to perform the action. The information may be provided based upon a level of customization associated with the customized spirit.

In some implementations, the processing module may update a status of production associated with the customized spirit. For example, a status may be updated when the processing module determines action is recommended to be taken, when action is taken, when sensor information is received, and/or at other times during production of the customized spirit. A status may be associated with overall production of the customized spirit, with production of a batch of customized spirit, with one or more casks, tanks, bottles, and/or other receptacles of customized spirit being produced, and/or with other components related to the production of the customized spirit. For example, a status of production may include status values of not started, at a specific production operation, distilled, aging, complete, and/or other status values.

In some implementations, the notification module may send notifications to the customer, group, and/or other entity based upon a level of customization associated with the customized spirit, and/or may perform other functionality related to notifying the customer, group, and/or other entity related to the production of the customized spirit. For example, when the processing module determines that action is recommended, the notification module may notify the customer regarding the action to be taken, may request input from the customer, group, and/or other entity regarding the action to the taken, and/or may otherwise communicate information relating to the action to be taken to the customer, group, and/or other entity. The information communicated by the notification module may depend upon a level of customization associated with the customized spirit. The notification may be done, for example, via email, text message, the portal/website associated with the distillery, a customer account associated with the distillery, postal mail, telephone call, social media post, TWEET, and/or other method of communication. The notification module may notify the customer, group, and/or other entity when various percentages of production of the customized spirit are complete, when input is required (or is to be required within a predetermined time period), when processing is complete, when tasting is to occur, when results of a tasting are available, when the aging of the spirit is complete, when environmental changes occur at the distillery and/or distillery storage, when an error occurs with production of the customized spirit, when an error occurs at the distillery and/or distillery storage, when a payment associated with production of the customized spirit is due, and/or for other reasons.

The inventory management module may be configured to associate one or more casks, tanks, bottles, and/or other receptacles of a batch of customized spirit with the appropriate customer, to determine where in the distillery storage to store one or more casks, tanks, bottles, and/or other receptacles, to maintain status information about one or more casks, tanks, bottles, and/or other receptacles, to maintain status information about one or more batches, and/or to perform other functionality related to managing the inventory of casks, tanks, bottles, and/or other receptacles of the distillery. The inventory management module may, for example, associate a batch of customized spirit with a customer by storing, in the storage module, an association between a batch identifier and a customer identifier. The inventory management module may store, in the storage module, associations between one or more casks, tanks, bottles, and/or other receptacles and one or more batches of customized spirit.

In some implementations, the inventory management module may be configured to determine where in the distillery storage to store batches of customized spirit, batches of spirits made by the distillery, and/or other batches of spirits. The inventory management module may determine where to store various batches of spirits based on, for example, where space is available, ideal environmental conditions for the batch (e.g., based on type of spirit, status of production of the spirit, and/or other factors), length of storage of the batch (e.g., weeks, months, years, permanently, and/or for other time periods), and/or other information related to storage of a batch of spirit. In some implementations, different sections of the distillery storage may be configured to provide ideal environmental conditions to store certain types of batches, to store batches at specific production operations, and/or based on other conditions of a batch.

The transaction management module may be configured to track transactions relating to customers, groups, and/or other entities, transactions related to the sale of spirits, transactions related to the storage of spirits, and/or other transactions related to the distillery. The transaction management module may be configured to track registration of customers, groups, and/or other entities with system, track the levels of customization associated with batches being produced, track the inventory maintained by the distillery, track the storage of customer batches in the distillery, and/or track other information related to customers, groups, batches, inventory, and/or other distillery information. The transaction management module may require a customer and/or group to pay a different fee based on a type of spirit to be produced by the customer, a proof strength of the spirit, an aging time of the spirit, a number of different types of spirits to be produced by the customer, a level of customization of producing the spirit, a level of customer service provided by the distillery, a number of visits to the distillery, education provided by the distillery, a number of batches produced, customized labeling of one or more casks, tanks, bottles, and/or other receptacles of aging product, customized labeling of one or more casks, tanks, bottles, and/or other receptacles of finished customized product, and/or other factors related to production and customer service provided to a customer, group, and/or other entity. The transaction management module may further include the appropriate functionality for receiving and processing payments from customers, groups, and/or other entities, including, for example, credit card payments, payments via third parties such as PayPal, electronic check processing, and/or other types of payments.

The storage module may be configured to store information related to system usage, customer information, and/or distillery content. For example, the storage information may be configured to store information related to customers, groups, batches, inventory, transactions, and/or information related to the distillery. The storage module may further store content developed and/or shared via the distillery management system.

The reporting module may be configured to facilitate analysis and report information related to system usage, customer information, and/or distillery content. The reporting module may also be configured to produce statistics regarding the information related to system usage and/or distillery content and may be further configured to prepare and/or display reports including one or more parts of the information related to system usage and/or distillery content and any statistics regarding that information related to system usage and/or distillery content. For example, the reporting module may prepare and/or display a report describing a batch of customized spirits based on a level of customization associated with customized spirit of the batch.

In some implementations, the distillery management system may be associated with a licensed distillery. The distillery may produce various spirits using its own recipes and machinery, for commercial and/or other purposes. The distillery may have large scale brewing and distilling facilities as well as the ability to micro-brew and micro-distill certain types of spirits. The distillery may sell spirits to stores, restaurants, merchants, online purchasers, to persons who visit the distillery, and/or to other entities. The distillery may allow customers, groups, and/or other entities to schedule tours of the distillery, tastings of one or more spirits, visits to make a customized batch of spirits, and/or other events at the distillery. For example, various participants such as customers, groups, distillery staff, and others may engage in the production, aging, and storage of customized spirits on a micro-brewing or micro-distilling scale. Customers, groups, and/or other entities that participate in producing a customized spirit may also age and store the spirit at the distillery storage site. The distillery management system may facilitate the production, aging, and storage of a customized spirit, manage customers, manage inventory, and/or perform other functionality related to managing a distillery.

In some implementations, a customer, group, and/or other entity may schedule a visit to the distillery based on an event on the distillery calendar. For example, the event may comprise making a customized batch of a specific type of spirit. Upon scheduling the visit, the distillery management system (e.g., the education module, the customization module, the batch management module, and/or other modules) may provide information to the customer, group, and/or other entity relating to producing the customized spirit, based on a level of customization associated with the customized spirit. In some implementations, when the distillery schedules a customized spirit producing event, the level of customization associated with the customized spirits being produced may be pre-determined by the distillery. For example, the level of customization may comprise participation in the recipe creation for the customized spirit. In another example, the level of customization may comprise participation in the recipe creation and participation in one or more tastings of the customized spirit. In some implementations, the predetermined levels of customization available to a customer may differ from the predetermined levels of customization available to a group and/or other entity. Other levels of customization may also be used.

In some implementations, the level of customization during a customized spirit producing event may be selected or tailored by the respective customers, groups, and/or other entities attending the event. For example, when requesting to customize a spirit via the distillery management system, the distillery management system may provide (e.g., via the education module, the customization module, and/or other modules) information about pre-determined levels of customization that comprise predefined levels of participation by a customer, group, and/or other entity. In some implementations, the distillery management system may allow a customer, group, and/or other entity to tailor a level of customization. For example, the distillery management system may allow a customer, group, and/or other entity to select a level of participation for one or more operations involved in producing the customized spirit, to select an amount of notifications provided, a type of notifications provided, times in the process at which notification is provided, a level of input in one or more operations, an amount of aging time, a proof strength, an amount of storage time, customized labels for one or more casks, tanks, bottles, and/or other receptacles to hold the customized spirit, and/or other customization.

In some implementations, the distillery management system may maintain information and/or statistics regarding one or more interactions with a customer, group, and/or other entity. For example, the distillery management system may maintain information including, for example, telephone calls, log ins to the portal/website, visits to the distillery, appointments to participate in distillery events, and/or other information related to interactions of one or more customers, groups, and/or other entities.

In some implementations, the distillery management system may facilitate the production, aging, and sale of distillery spirits. Distillery spirits may include, for example, spirits that are produced and aged without input from a customer, group, and/or other entity. For example, the distillery management system may operate without receiving input or providing notification to a customer, group, and/or other entity during the production and aging of distillery spirits. In another example, instead of providing notifications and receiving input from a customer, group, and/or other entity, the distillery management system may provide notifications and receive input from distillery staff.

In some implementations, the distillery management system may maintain information regarding producing one or more spirits. The spirits may be spirits produced by the distillery and/or customized spirits produced with participation by one or more customers, groups, and/or other entities. The information may include, for example, data on the recipe used and conditions of creating the recipe (e.g., raw ingredients, enzymes used, starch conversion rate, temperate, and/or other information and conditions related to recipe creation), data on fermentation (e.g., fermentation of the wort, yeast used, sugar conversion rate, alcohol content, temperature, and/or other information and conditions related to fermentation), data on distillation (e.g., amount of distillate that runs through the stills, flow rate, introduction of one or more flavorings, introduction of one or more botanicals, temperature, pressure, reflux rates, number and type of plates used in a column, water flow rates, condenser temperature, dephlegmator temperature, final product proof, product temperature, and/or other information and conditions related to distillation), data on head receipt (e.g., production time, still temperature, volume, flow, and/or other information and conditions related to head receipt), data on heart receipt (e.g., production time, still temperature, volume, flow, and/or other information and conditions related to heart receipt), data on tail receipt (e.g., production time, still temperature, volume, flow, and/or other information and conditions related to tail receipt), data on type of still used, data on number of plates using in the reflux column, data on filtering (e.g., filtering rate, addition of one or more botanicals, addition of one or more flavorings, and/or other information and conditions related to filtering), label information (e.g., customer information, production information, proof strength, alcohol content, flavorings, colorings, additives, aging time, type of aging container used, whether wood chips or other wood products were used for coloring and aging, charring or toasting of wood, type of wood used, type of spirit, and/or other information related to labeling a cask, tank, bottle, and/or other storage unit comprising the spirit), storage of the spirit (e.g., customer information relating to a customized spirit, customer information relating to a batch of spirits produced by the distillery and purchased by the customer, spirit type, fill date, fill amount, fill proof, amount of aging, and/or other information related to storage of the spirit), data related to tasting (e.g., date of tasting, customers, groups, and/or other entities that tasted the cask, tank, bottle, and/or other storage unit of spirit, amount of samples, changes made based on tasting, reviews associated with the tasting, bottles removed, proof strength of spirit tasted, and/or other information related to a spirit tasting), and/or other information related to producing one or more spirits at the distillery.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
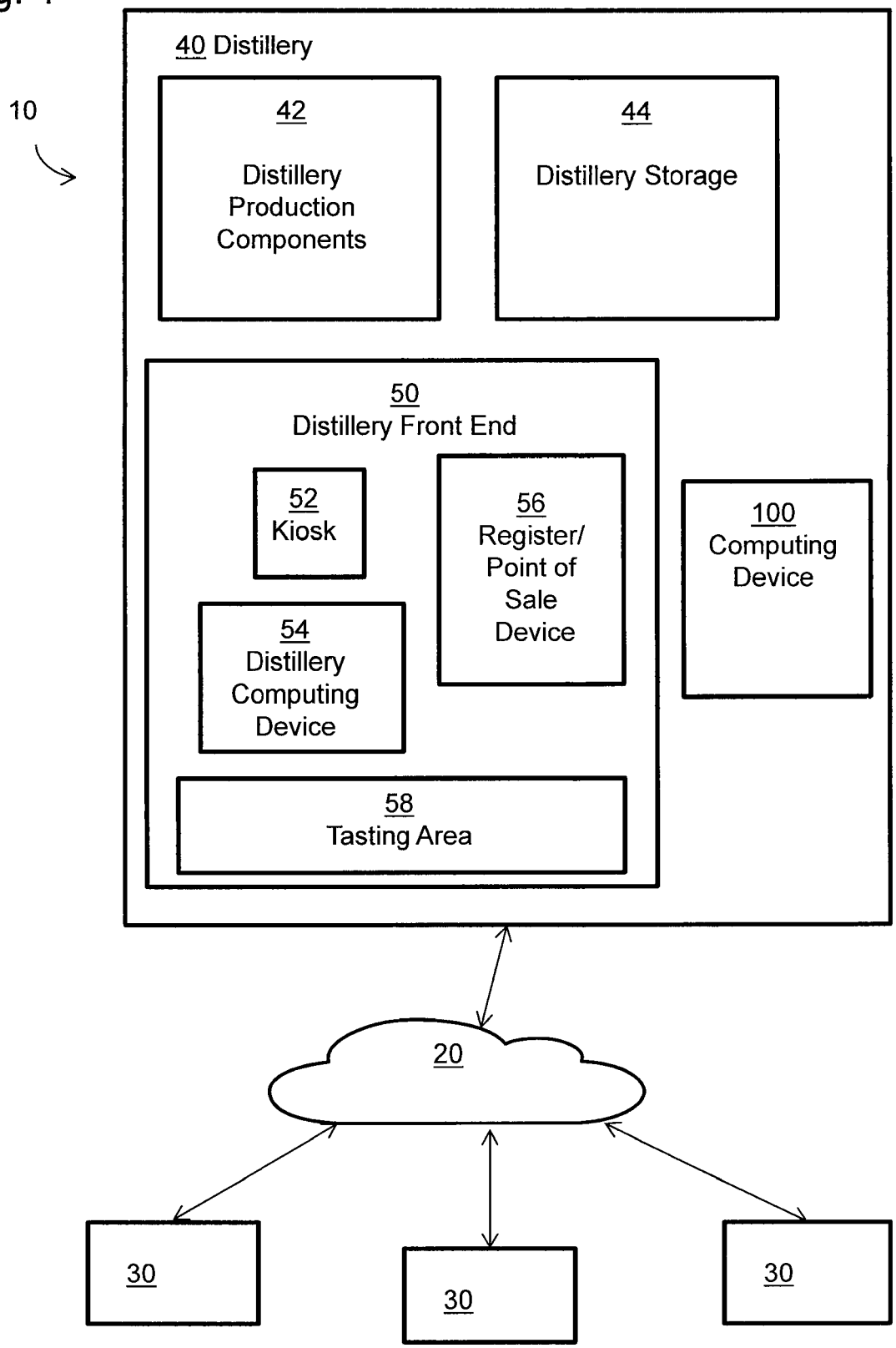
FIG. 1 illustrates a block diagram of an exemplary system for automated distillery management including the ability to manage customers, manage inventory, and facilitate the production, aging, and sale of customized spirit, according to an aspect of the invention.

FIG. 1 illustrates a diagram of a system 10 for automated distillery management, including the ability to manage customers, manage inventory, and facilitate the production, aging, and sale of customized spirits, according to an implementation of the invention. The system 10 may include a network 20, client computing devices 30, and a licensed distillery 40. The licensed distillery 40 may produce various spirits using its own recipes and machinery, for commercial and/or other purposes. The types of spirits produced by the licensed distillery 40 may include for example, whiskey, gin, vodka, beer, wine, hard cider, ale, and/or other fermented drinks. The licensed distillery 40 may have large scale brewing and distilling facilities as well as the ability to micro-brew or micro-distill certain types of spirits. The licensed distillery 40 may sell spirits to stores, restaurants, merchants, online purchasers, to persons who visit the distillery, and/or to other entities. The licensed distillery 40 may allow customers, groups, and/or other entities to schedule tours of the licensed distillery 40, tastings of one or more spirits, visits to make a customized batch of spirits, and/or other events at the licensed distillery 40. For example, various participants such as customers, groups, distillery staff, and others may engage in the production, aging, and storage of customized spirits on a micro-brewing or micro-distilling scale. Customers, groups, and/or other entities that participate in producing a customized spirit may also age and store the spirit at the distillery storage 44. The distillery management system 10 may facilitate the production, aging, and storage of a customized spirit, manage customers, manage inventory, and/or perform other functionality related to managing a licensed distillery 40.

In some implementations, the licensed distillery 40 may comprise distillery production components 42, distillery storage 44, a distillery front end 50, a computing device 100 configured to facilitate automated management of customers, management of inventory, and production, aging, and sale of customized spirits for the licensed distillery 40, and/or other components.

The distillery production components 42 may include components for large scaled brewing and/or distilling of spirits, components for micro-brewing and/or micro-distilling of spirits, and/or other components used in producing spirits. For example, the distillery production components 42 may comprise one or more of: a grinder and/or grain mill, mash cooker, mixer, a fermenter, a pot, a distillation column, a lyne arm, a condenser, a chiller, receptacles, filters, bottlers, labelers and/or other components. The distillery production components 42 may comprise conventional components used in brewing and distilling spirits.

The distillery storage 44 may include one or more storage units configured to store one or more casks, tanks, bottles, and/or other receptacles of spirits. A cask may be a barrel, a crate, and/or any other storage unit configured to store spirits. A tank may be a stainless steel, plastic or other appropriate tank, tote, and/or other receptacle configured to store spirits. The distillery storage 44 may have one or more sections for storing spirits produced by the distillery, storing customized spirits, aging spirits produced by the distillery, aging customized spirits, sections with specific environmental conditions, sections for displaying stored casks, tanks, bottles, and/or other receptacles, and/or other sections. One or more sections of the distillery storage 44, one or more storage units, one or more casks, one or more tanks, one or more bottles, and/or other components of the distillery storage 44 may comprise one or more types of sensors (as described below).

The distillery front end 50 may comprise one or more kiosks 52, one or more distillery computing devices 54, one or more registers/point of sale devices 56, a tasting area 58, and/or other components. As discussed below, information related to the licensed distillery 40, the distillery management system 10, and/or other information may be provided via the one or more kiosks 52, the one or more distillery computing devices 54, one or more staff members at the licensed distillery 40, and/or by other methods. A register/point of sale device 56 may be configured to execute transactions that occur at the licensed distillery 40. For example, the register/point of sale device 56 may record a sale of spirits, an agreement to store spirits at the distillery storage 44 for a predetermined period of time, an agreement to produce a customized spirit, and/or other transactions. The register/point of sale device 56 may be configured to generate, print, and/or share invoices, receive payment, store the transaction, and/or perform other functionality related to executing transactions. The tasting area 58 may comprise an area at which one or more customers, groups, and/or other entities may gather to participate in a tasting of one or more spirits. In some implementations, the tasting area 58 may comprise a display of one or more spirits.

Figure 2:
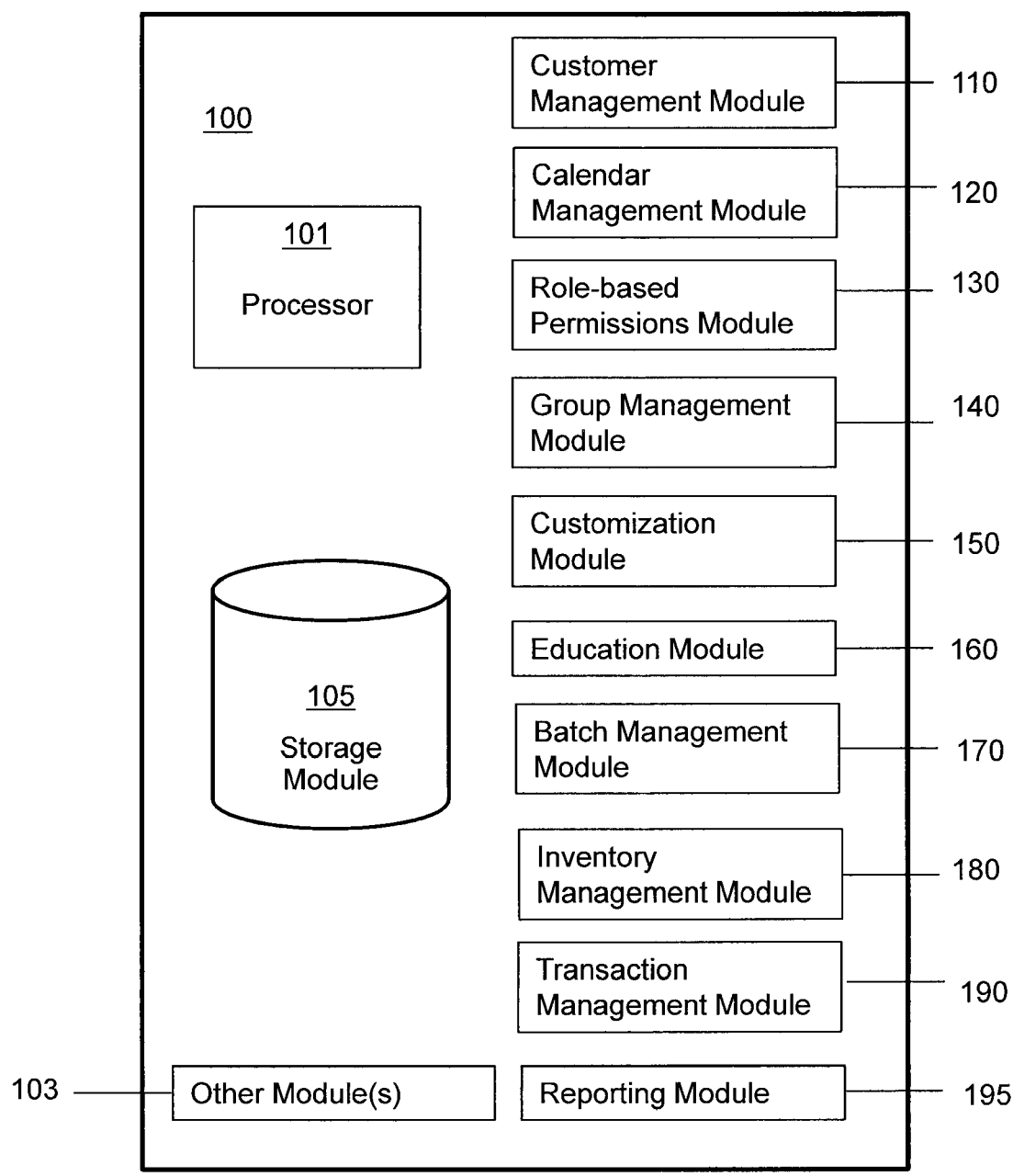
FIG. 2 illustrates a block diagram of an exemplary computing device configured to facilitate automated management of customers, management of inventory, and production, aging, and sale of customized spirits for a distillery, according to an aspect of the invention.

As shown in FIG. 2, the computing device 100 may include a processor 101 configured to perform some or all of a functionality of a plurality of modules. In some implementations, the computing device 100 may comprise a non-transitory, tangible computer-readable storage medium (e.g., storage module 105) with an executable program stored thereon, wherein the program instructs a microprocessor (e.g., processor 101) to perform some or all of the functionality of the plurality of modules. The plurality of modules may include, for example, a customer management module 110, a calendar management module 120, a role-based permissions module 130, a group management module 140, a customization module 150, an education module 160, a batch management module 170, an inventory management module 180, a transaction management module 190, a reporting module 195, a storage module 105, and/or other module(s) 103. A distillery (e.g., licensed distillery 40) may use the system 10 to facilitate management of customers and inventory, and production, aging, and sale of spirits. A customer, group, and/or other entity may access the distillery management system 10 via, for example, one or more interfaces (e.g., web pages) communicated from the computing device 100 to a client device, an application such as a mobile application executing on a client device that generates the interface based on information communicated from the computing device 100, an agent running on the computing device 100, and/or via other interfaces.

The computing device 100 may facilitate automated management of customers, management of inventory, and production, aging, and sale of customized spirits for a licensed distillery 40. The licensed distillery 40 may produce various spirits using its own recipes and machinery, for commercial and/or other purposes. Further, various participants such as customers, groups, distillery staff, and others may engage in the production, aging, and storage of customized spirits on a micro-brewing and/or micro-distilling scale. For example, customers, groups, and/or others may visit the licensed distillery 40 and participate in the production of a batch of customized spirit. The batch of customized spirit may comprise, for example, one or more casks, tanks, bottles, and/or other receptacles of a specific type of customized spirit. Customers may be individuals or families that would like to produce a customized spirit. A group may be an organization, company, and/or other entity that comprises one or more customers as group members, where the group may produce one or more customized spirits.

Various levels of customization may be available when producing a customized spirit. A level of customization may comprise, for example, one or more types of participation related to production of the customized spirit. The types of participation may comprise one or more of: selection of the type of spirit to be produced, selection of an amount of time the customized spirit is aged, participation in recipe creation, participation in tasting the spirit during production, notification of one or more actions to be taken during production of the customized spirit, provision of input regarding one or more actions to be taken during production of the customized spirit, and/or other types of participation. For example, a level of customization associated with a spirit may be based upon type of spirit, recipe selection, amount of involvement in production process, type of involvement in production process, amount of notifications provided, types of notifications provided, participation in tasting during production process, spirit proof, aging time, storage time, customized labels for one or more casks, tanks, bottles, and/or other receptacles to hold the customized spirit and/or other factors related to producing a customized spirit. Customers, groups, and/or others that participate in producing a customized spirit may also age and store the spirit at the distillery storage 44. The distillery management system 10 may facilitate the production, aging, and storage of a customized spirit, manage customers, manage inventory, and/or perform other functionality related to managing a licensed distillery 40.

The customer management module 110 may be configured to allow a customer or other participant to register with the system, to maintain profile information for one or more customers, and/or perform other functionality related to customer management. The calendar management module 120 may be configured to facilitate scheduling of customer visits, scheduling of group visits, maintain a calendar for the licensed distillery 40, provide information related to schedules, and/or perform other functionality related to managing a calendar for the licensed distillery 40. The role-based permission module 130 may facilitate system-based, batch-based, and group-based role management, with a role being associated with system-level access, batch-level access, group-level access and/or other access to distillery content. The group management module 140 may facilitate registration of a group including one or more customers as group members, and/or perform other functionality related to group management. The customization module 150 may be configured to accept a customization request, maintain an electronic forum for customers, groups, and/or other entities to communicate, and/or provide other functionality related to producing customized spirits. The education module 160 may be configured to provide education related to production of different types of spirits, customization of spirits, available levels of customization for different types of spirits, timelines for producing different types of spirits, and/or other information regarding spirits and/or the production of spirits. The batch management module 170 may be configured to provide information regarding recipe preparation and processing operations for the customized spirit to be produced, to receive sensory information from the licensed distillery 40, to recommend changes in production conditions, to recommend progressing to a next processing operation, to notify customers regarding processing of the customized spirit, and/or perform other functionality related to managing the production of a batch of customized spirit. The inventory management module 180 may be configured to associate one or more casks, tanks, bottles, and/or other receptacles of a batch of customized spirit with the appropriate customer, to determine where in distillery storage 44 to store one or more casks, tanks, bottles, and/or other receptacles, to maintain status information about one or more casks, tanks, bottles, and/or other receptacles, to maintain status information about one or more batches, and/or to perform other functionality related to managing the inventory at the licensed distillery 40. The transaction management module 190 may be configured to track transactions relating to customers, groups, and/or other entities, transactions related to the sale of spirits, transactions related to the storage of spirits, and/or other transactions related to the licensed distillery 40. The storage module 105 may be configured to store information related to system usage, customer information, and/or distillery content. The reporting module 195 may be configured to facilitate analysis and report information related to system usage, customer information, and/or distillery content. System 10 may include other module(s) 103 as well.

Figure 3:
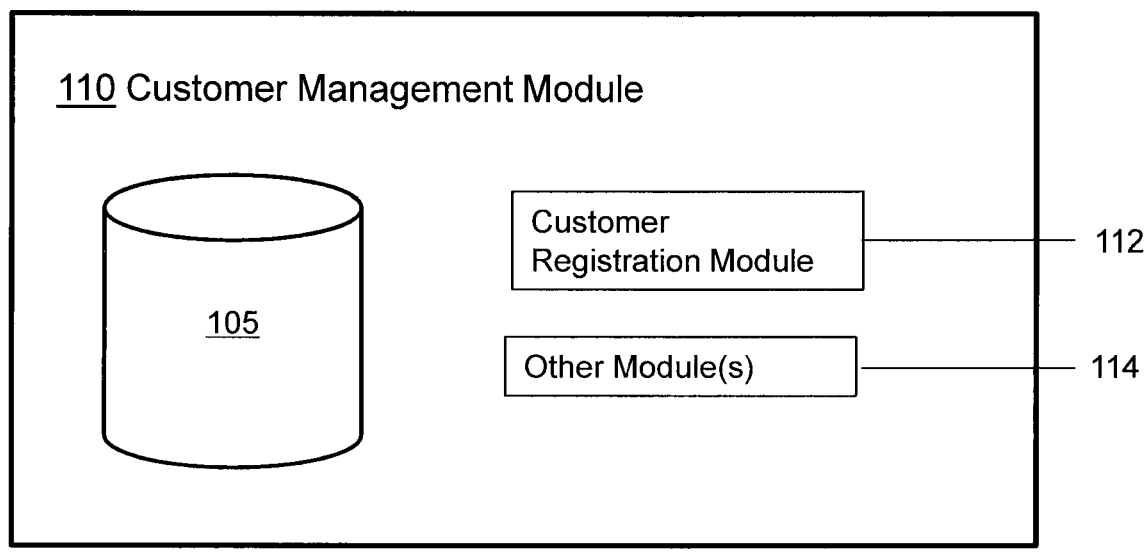
FIG. 3 illustrates a block diagram of an exemplary customer management module, according to an aspect of the invention.

As shown in FIG. 3, the customer management module 110 may be configured to allow a customer or other participant to register with the system, to maintain profile information for one or more customers, and/or perform other functionality related to customer management. In some implementations, the customer management module 110 may comprise a customer registration module 112 and/or other modules 114. The customer registration module 112 may be configured to accept and store profile information for a customer. The customer management module 110 may also maintain and update profile information for a customer. For example, the customer management module 110 may update a customer profile based on interaction with the licensed distillery 40, interaction with the distillery management system 10, processing by one or more modules of the distillery management system 10, data received, obtained, derived, associated with, or provided via one or more modules of the distillery management system 10, and/or other information related to the customer.

In some implementations, the customer registration module 112 of the customer management module 110 may be configured to accept and store profile information for a customer. A customer may be an individual or family that would like to produce a customized spirit. The profile may include information related to the customer including, for example, customer identifier (e.g., a unique combination of letters, numbers, and/or other characters that may be identify the customer), name(s), age(s), address, telephone number, email, preferred mode of contact, preferred type(s) of spirits, customization requests, associated recipes, associated groups, associated batches, associated inventory, distillery visit history, education received (e.g., via a kiosk 52 at the licensed distillery 40, an app installed on a client computing device 30, an app installed on a distillery client device 54 of the licensed distillery 40, a website or portal associated with the licensed distillery 40, distillery staff, and/or other source), secure identification (e.g., username, password, and/or other secure identification items), transaction history, and/or other information that may be associated with the customer.

Returning to FIG. 2, the calendar management module 120 may be configured to facilitate scheduling of customer visits, facilitate scheduling of group visits, maintain a calendar for the licensed distillery 40, provide invitations to customers, groups, and/or other entities based on schedules stored on the distillery calendar, and/or perform other functionality related to managing a calendar for the licensed distillery 40. For example, the calendar management module 120 may maintain a calendar for the licensed distillery 40. The calendar may include information related to, for example, scheduled customer visits, scheduled group visits, scheduled tours, scheduled tasting, events held by the licensed distillery 40, scheduled days on which specific customized spirits are available to be produced, and/or other calendar information related to customers at the licensed distillery 40. In some implementations, calendar information may also maintain information related to one or more production schedules for customized spirits, dates at which notifications are to be sent to customers, groups, and/or other entities, dates at which invitations to events are to be sent to customers, groups, and/or other entities, one or more production schedules for distillery spirits, and/or other calendar information related to internal management at the licensed distillery 40. The calendar management module 120 may also accept and store appointment information related to customer visits and/or group visits for the licensed distillery 40. In some implementations, the appointment information may include, for example, names of the customers, groups, and/or entities visiting the licensed distillery 40, purpose of visit, date of visit, time of visit, length of visit, associated transactions, associated inventory, potential sales, potential transactions, and/or other information related to the visit. The calendar management module 120 may update the calendar based upon the appointment information received from a customer, a group, and/or other entity interested in visiting the licensed distillery 40. The calendar management module 120 may provide invitations to a customer, group, and/or other entity based on schedules stored at the distillery calendar. For example, the calendar management module 120 may provide an invitation to a customer based on a tasting that the customer is schedule to attend according to a customization level associated with customized spirits of the customer.

The role-based permission module 130 may be configured to tailor a customer's access to the system 10 based on one or more roles associated with the customer. In some implementations, the role-based permission module 130 may be configured to tailor a group's access to the system based on one or more roles associated with the group. The one or more roles may include system-level roles, batch-based roles and/or group-based roles.

System-level roles may grant access to various system features such as for example, access to one or more modules, access to distillery content stored at a storage module, and/or other access to system features. Distillery content may include information related to customers, groups, batches, inventory, transactions, and/or other information related to the licensed distillery 40. Different system-level roles may be granted that provide access to different system features. For example, a distillery administrator may be able to access some or all information stored at the storage module, while a customer may be able to access some or all information stored at the storage module and related to the customer.

Batch-level roles may grant access to batch information related to a specific batch. Batch information may include, for example, information relating to how the batch is made, the recipe for the batch, potential changes available to the recipe for the batch, the processing status of the batch, the proof of the batch, the aging process of the batch, an amount that the batch has been (or will be) aged, one or more parameters related to how the batch is processed, changes made to the batch, environmental conditions associated with the batch, changes to environmental conditions associated with the batch, and/or other information related to the batch. Different batch-based roles may be granted that provide access to different batch information, facilitate the receipt of input related to batch processing, and/or provide other access to the batch. The access provided by a batch-level role may depend, for example, upon a level of customization related to the customized spirit associated with the batch and/or a system-role. Group-based roles may grant access to various system features such as for example, access to one or more modules, access to distillery content stored at a storage module, access to batch information stored at a storage module, and/or other access to system features. Different group-level roles may be granted that provide access to different system features. For example, a group administrator may have different access to distillery information and/or batch information than a group member.

The role-based permissions module 130 may maintain a plurality of roles, including, for example, administrator, staff, customer, group administrator, group member, and/or other roles. A customer registered with the system 10 may access the system 10 using one or more roles. For example, the access available to a customer may be based on various ones of the customer's system-level roles, batch-based roles, and/or group-based roles.

The group management module 140 may facilitate registration of a group including one or more customers. For example, the group management module 140 may accept and store profile information for a group. A group may be a company, family, group of friends, organization, and/or other entity. The profile information for a group may include, for example, a group identifier (e.g., a unique combination of letters, numbers, and/or other characters that may be identify the group), customers in group (e.g., identified by customer identifier), group address, group telephone number, group point of contact, company name, entity name, maximum number of group members, preferred mode of communication, preferred group member(s) to contact, preferred type(s) of spirits, customization requests, recipes associated with the group, other groups associated with the group, batches associated with the group, inventory associated with the group, distillery visit history, education received by the group (e.g., via a kiosk 52 at the licensed distillery 40, an app installed on a client computing device 30, an app installed on a distillery computing device 54 of the licensed distillery 40, a website or portal associated with the licensed distillery 40, distillery staff, and/or other source), secure identification for the group (e.g., username, password, and/or other secure identification items), transaction history associated with the group, and/or other information related to a group. When registering a group, the group management module 140 may determine whether the one or more group members in the group are already registered as customers with the distillery management system. When a group member in the group has not yet registered as a customer with the distillery management system 10, the group management module 140 may register the group member as a customer in a manner similar to the customer registration module of the customer management module.

The group management module 140 may associate the customers in the group with the group. For example, the group management module 140 may associate a customer identifier associated with the customer with the group identifier. The group management module 140 may update profile information for a customer in the group to indicate the group association. In some implementations, the customer management module 110 may perform same or similar functionality as the group management module 140.

The customization module 150 may be configured to accept a customization request, maintain an electronic forum for customers, groups, and/or other entities to communicate, and/or provide other functionality related to producing customized spirits. The customization request may include, for example, customer name(s), group name(s), number of casks, tanks, bottles, and/or other receptacles, type of spirit, recipe associated with spirit, level of customization, and/or other information related to producing a customized spirit. The customization module 150 may be configured to accept a customization request via, for example, a kiosk 52 at the licensed distillery 40, an app installed on a client computing device 30, an app installed on a distillery computing device 54 of the licensed distillery 40, a website or portal associated with the licensed distillery 40, via one or more staff members of the licensed distillery 40, and/or by other methods. The customization module 150 may be configured to determine whether the one or more customers and/or one or more groups associated with the customization request are registered with the distillery management system 10. When the customization module 150 determines that one or more customers, groups, and/or other entities are not registered with the distillery management system 10, the customization module 150 may accept and store profile information for the one or more customers and/or one or more groups in a manner similar to the customer registration module of the customer management module 150.

In some implementations, the customization module 150 may also maintain an electronic forum for customers, groups, and/or other entities registered with the distillery management system 10. The forum may be provided, for example, via a portal, web site, and/or other communication media. In some implementations, the customization module may facilitate the sharing of information via the forum. The information shared by customers, groups, and/or other entities may include, for example, recipes for producing customized spirits, tweaks to operations involved in producing customized spirits, photos, videos, notes and/or other materials related to producing customized spirits, ratings associated with different inputs provided during the production of a customized spirit, ratings associated with recipes for a type of spirit, ratings associated with different levels of customization, reviews associated with different inputs provided during the production of a customized spirit, reviews associated with recipes for a type of spirit, reviews associated with different levels of customization, and/or other information that a customer, group, and/or other entity may want to share via the forum. The customization module 150 may also facilitate the sharing of information of the forum via email, text, TWEET, blog post, social media post, and/or by other methods by which information may be shared. In some implementations, the customization module 150 may also facilitate instant messaging, group chats, video chats, and/or other methods of communication via the forum.

The education module 160 may be configured to provide education related to production of different types of spirits, customization of spirits, available levels of customization for different types of spirits, timelines for producing different types of spirits, and/or other information regarding spirits and/or the production of spirits. In some implementations, the education module 160 may provide education via one or more kiosks 52 at the licensed distillery 40. For example, the education module 160 may facilitate the viewing of one or more videos related to different topics, may play videos that play on a repeated loop, may facilitate interaction with an application available at the kiosk 52, and/or may provide the information in other ways via the one or more kiosks 52. In some implementations, the education module 160 may provide education via an application that may be downloaded to a client computing device 30, accessed via a distillery computing device 54 of the licensed distillery 40, and/or accessed in other ways. The education module 160 may facilitate customer interaction with the devices via which the education is provided, may include multimedia content, may facilitate the sharing of information provided (e.g., via email, text, TWEET, blog post, social media post, and/or by other methods by which information may be shared), and/or may provide other functionality related to providing education regarding spirits and/or the production of spirits.

In some implementations, the education module 160 may provide location-based education. For example, the education module 160 may be configured to obtain location data via, for example, a device via which the education is provided. Based on a location of the device (e.g., inside the licensed distillery 40, at a tasting area 58 associated with the licensed distillery 40, at a kiosk 52 at the licensed distillery 40, in a particular section of the distillery storage 44, at a particular section of the licensed distillery 40 that handles a certain type of processing, and/or other locations related to the licensed distillery 40), the education module 160 may provide information related to activities that may occur at and/or near the location. For example, the education module may facilitate a walking tour of the licensed distillery 40. In some implementations, the education module 160 may provide a map of the licensed distillery 40 for viewing and interaction. For example, the education module 160 may provide information about a specific location or processes that occur at a specific location in response to a user's interaction with that location on the map. An interaction may be determined, for example, by contact with the location on the map (e.g., as provided via a client computing device 30 running an application, via a kiosk 52 at the licensed distillery 40, and/or via other methods of communicating the information), by voice recognition of a user naming a location tagged on the map, by spatial recognition of a user's gaze, and/or other interaction with the map.

In some implementations, the education module 160 may be configured to provide customized education to a customer, group, and/or other entity based upon a level of customization associated with a customized spirit of that customer, group, and/or other entity. For example, the education module 160 may be configured to provide information about various kinds of user input available for an operation during production of the customized spirit, where an associated level of customization allows user input during that operation. For example, the education module 160 may be configured to provide various recipes for making a type of spirit.

In some implementations, the education module 160 may be configured to access information provided by the distillery staff, information provided by customers, groups, and/or other entities that have produced customized spirits, information available on the internet or other publicly available networks, and/or other information. The information provided by customers, groups, and/or other entities may include, for example, information provided via the customization module 150. For example, the information provided by customers, groups, and/or other entities may include, for example, ratings associated with different inputs provided during the production of a customized spirit, ratings associated with recipes for a type of spirit, ratings associated with different levels of customization, reviews associated with different inputs provided during the production of a customized spirit, reviews associated with recipes for a type of spirit, reviews associated with different levels of customization, information shared by customers, groups, and/or other entities, and/or other information provided by customers, groups, and/or other entities.

Figure 4:
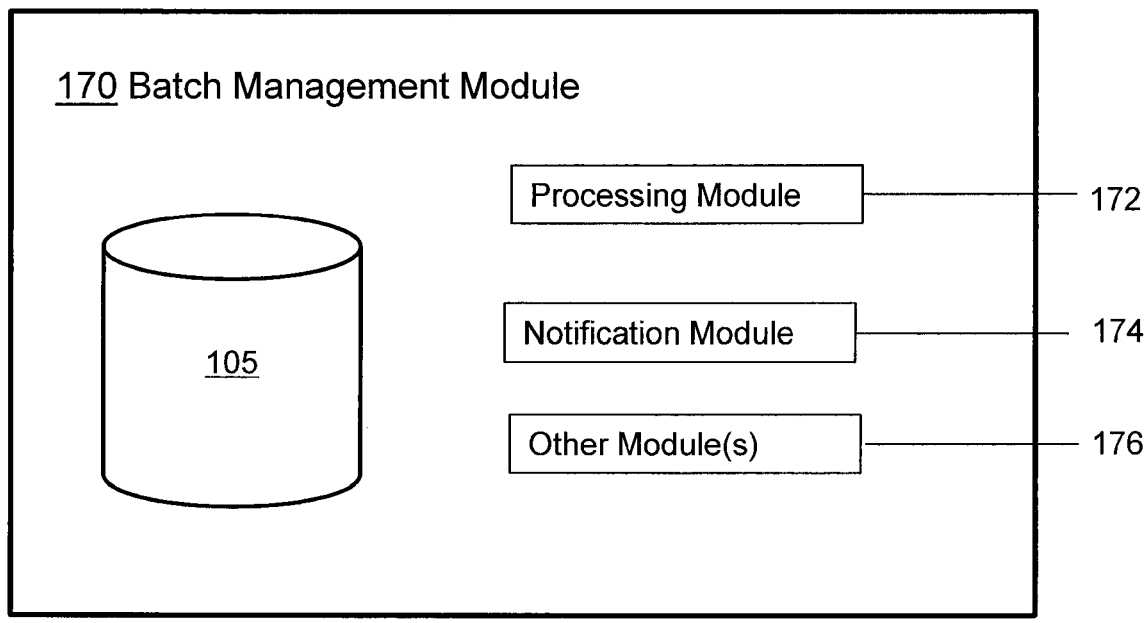
FIG. 4 illustrates a block diagram of an exemplary batch management module, according to an aspect of the invention.

As shown in FIG. 4, the batch management module 170 may be configured to provide information regarding recipe preparation and processing operations for the customized spirit to be produced, to receive sensory information from the licensed distillery 40, to recommend changes in production conditions, to recommend progressing to a next processing operation, to notify customers, groups, and/or other entities regarding processing of the customized spirit, and/or perform other functionality related to managing the production of a batch of customized spirits. In some implementations, the batch management module 170 may comprise one or more modules, including, for example, a processing module 172, a notification module 174, and/or other modules 176. The processing module 172 may provide information regarding the operations for producing a customized spirit, may monitor the processing of the customized spirit, and may provide recommendations regarding actions to be taken regarding the processing of the customized spirit to the system, the distillery staff, the customer, group and/or other entities associated with producing the customized spirit, and/or may perform other functionality related to the processing of the customized spirit. The notification module 174 may monitor the processing of the customized spirit, may send notifications to the customer and/or group based upon a level of customization associated with the customized spirit, and/or may perform other functionality related to notifying the customer and/or group related to the processing of the customized spirit.

The processing module 172 may be configured to provide information regarding the operations for producing a customized spirit, may monitor the processing of the customized spirit, may provide recommendations regarding actions to be taken regarding the processing of the customized spirit to the system, the distillery staff, the customer, group and/or other entities associated with producing the customized spirit, may provide recommendations regarding actions to be taken regarding the processing of the customized spirit to the system, the distillery staff, the customer, group and/or other entities associated with producing the customized spirit, and/or may perform other functionality related to the processing of the customized spirit.

The processing module 172 may be configured to provide instructions regarding recipe preparation and processing operations for the customized spirit to be produced. For example, the processing module 172 may be configured to provide instructions via one or more kiosks 52 at the licensed distillery 40, via an application that may be downloaded to a client computing device 30, via an application that may be accessed using a distillery computing device 54 of the licensed distillery 40, via email, via automated phone call, and/or via other communication media. The processing module 172 may facilitate customer interaction with the devices via which the instructions are provided, may include multimedia content, may facilitate the sharing of information provided (e.g., via email, text, TWEET, blog post, social media post, and/or by other methods by which information may be shared), and/or may provide other functionality related to providing instructions regarding recipe preparation and processing operations for the customized spirit to be produced.

In some implementations, the instructions provided may depend upon the type of customized spirit being produced. For example, different recipes may be available for use with different types of spirits. In another example, one or more operations for producing the customized spirit may be tweaked or changed for different types of spirits. Operations involved in producing a customized spirit may include, for example, recipe creation, fermentation, enzyme usages, yeast selection, steam pumping, selection of type and amount of heat sourced used, type of still equipment used, distillation, selection of batch or continuous method, selection of number of times of distillation, selection of number of times of redistillation, concentration, selection of reflux ratio, type of still equipment used, selection of batch or continuous method, selection of number of times of distillation or redistillation, selection of reflux ratio, selection of the number and types of plates used in a tower configuration, selection of the type of metal used in the still (such as stainless steel or copper), condensation, head receipt, heart receipt, tail receipt, blending, proofing, filtering, infusion, aging, selection of type of cask used for aging (if any), and/or other operations involved in producing the customized spirit.

In some implementations, the instructions provided may depend upon the level of customization associated with the customized spirit. For example, the instructions may include information related to different recipes that could be used to produce the customized spirit, when the level of customization includes the ability to tweak the recipe used for the spirit. In another example, the instructions may include potential options for inputs during an operation for production, consequences of the input choices, the most popular input choice, the most used input choice, and/or other information related to inputs when the level of customization includes an ability to provide input related to the operation. The information provided in the instructions may be customized in other ways as well and is not limited to the examples provided herein.

In some implementations, the instructions may comprise, for example, text, photos, videos, multimedia content, and/or other information related to producing the customized spirit. For example, the instructions may comprise, for an operation, a before picture, an after picture, text relating to what should be done for the operation, video showing how to perform functionality needed for the operation, and/or other instructions related to the operation. In some implementations, the processing module 172 may provide instructions at or near a time and/or location at which the instructions may be used. For example, instructions relating to creating the recipe for the customized spirit may be provided at the licensed distillery 40 a predetermined time before the customer, group, and/or other entity is ready to mix or is mixing the recipe for the customized spirit. In another example, instructions related to providing input to an operation may be provided a predetermined time before the operation is scheduled to begin. The predetermined time may depend upon the type of input needed, the length of the operation, the length of the previous operation, the method by which input may be provided (e.g., whether the customer, group, and/or other entity needs to travel to the licensed distillery 40 to provide input), and/or other factors relating to receiving the input in a timely manner.

In some implementations, the processing module 172 may be configured to receive sensor information from the licensed distillery 40. For example, one or more sensors may be placed at the licensed distillery 40, at or near distillery production components 42, at or near distillery storage 44, and/or at other locations at the licensed distillery 40. The sensors may comprise one or more types of sensors including, for example, temperature sensors, humidity sensors, pressure sensors, flow sensors, and/or other types of sensors. The processing module 172 may be configured to receive sensor information from the sensors. For example, the processing module 172 may be configured to receive the sensor information through wired and/or wireless channels. The sensors may be placed at one or more sections of the licensed distillery 40, at or near distillery production components 42, at or near distillery storage 44, may be placed at one or more positions at one or more casks, may be placed spaced apart on each row of cask, tanks, bottles, and/or other receptacles storage at the distillery storage 44, and/or may be placed at other locations of the licensed distillery 40. Different types of sensors and/or different combinations of types of sensors may be placed at different locations of the licensed distillery 40. For example, different combinations of types of sensors may be placed at different locations based upon the information to be sensed at the respective locations.

In some implementations, the processing module 172 may use the sensor information received from the one or more sensors to determine whether action is recommended to occur relating to the production of the customized spirit. For example, the processing module 172 may determine whether other action is recommended to occur based on sensor information and information stored at the storage module 105 related to producing the customized spirit. In some implementations, the processing module 172 may use the sensor information to determine whether an environmental condition is recommended to be changed based on whether the sensor information sensed by one or more sensors is outside an acceptable range of values. The processing module 172 may determine that a next operation in production of the customized spirit is recommended to begin based on sensor information and conditions stored at the storage module 105 relating to the operations involved in producing the customized spirit. For example, based on a comparison of the sensor information received and conditions stored at the storage module 105, the processing module 172 may determine that a next operation is recommended. In some implementations, when action is recommended to occur, the processing module 172 and/or the education module 160 may provide information related to the action and related to how to perform the action. The information may be provided based upon a level of customization associated with the customized spirit.

In some implementations, the processing module 172 may update a status of production associated with the customized spirit. For example, a status may be updated when the processing module 172 determines action is recommended to be taken, when action is taken, when sensor information is received, and/or at other times during production of the customized spirit. A status may be associated with overall production of the customized spirit, with production of a batch of customized spirit, with one or more casks, tanks, bottles, and/or other receptacles of customized spirit being produced, and/or with other components related to the production of the customized spirit. For example, a status of production may include status values of not started, at a specific production operation, distilled, aging, complete, and/or other status values.

In some implementations, the notification module 174 may send notifications to the customer, group, and/or other entity based upon a level of customization associated with the customized spirit, and/or may perform other functionality related to notifying the customer, group, and/or other entity related to the production of the customized spirit. For example, when the processing module 172 determines that action is recommended, the notification module 174 may notify the customer regarding the action to be taken, may request input from the customer, group, and/or other entity regarding the action to the taken, and/or may otherwise communicate information relating to the action to be taken to the customer, group, and/or other entity. The information communicated by the notification module 174 may depend upon a level of customization associated with the customized spirit. The notification may be done, for example, via email, text message, the portal/website associated with the licensed distillery 40, a customer account associated with the licensed distillery 40, postal mail, telephone call, social media post, TWEET, and/or other method of communication. The notification module 174 may notify the customer, group, and/or other entity when various percentages of production of the customized spirit are complete, when input is required (or is to be required within a predetermined time period), when processing is complete, when tasting is to occur, when results of a tasting are available, when the aging of the spirit is complete, when environmental changes occur at the licensed distillery 40 and/or distillery storage 44, when an error occurs with production of the customized spirit, when an error occurs at the licensed distillery 40 and/or distillery storage 44, when a payment associated with production of the customized spirit is due, and/or for other reasons.

The inventory management module 180 may be configured to associate one or more casks of a batch of customized spirit with the appropriate customer, to determine where in the distillery storage 44 to store one or more casks, tanks, bottles, and/or other receptacles, to maintain status information about one or more casks, tanks, bottles, and/or other receptacles, to maintain status information about one or more batches, and/or to perform other functionality related to managing the inventory of casks, tanks, bottles, and/or other receptacles of the licensed distillery 40. The inventory management module 180 may, for example, associate a batch of customized spirit with a customer by storing, in the storage module, an association between a batch identifier and a customer identifier. The inventory management module 180 may store, in the storage module, associations between one or more casks, tanks, bottles, and/or other receptacles and one or more batches of customized spirit.

Returning to FIG. 2, the inventory management module 180 may be configured to determine where in the distillery storage 44 to store batches of customized spirit, batches of spirits made by the licensed distillery 40, and/or other batches of spirits. The inventory management module 180 may determine where to store various batches of spirits based on, for example, where space is available, ideal environmental conditions for the batch (e.g., based on type of spirit, status of production of the spirit, and/or other factors), length of storage of the batch (e.g., weeks, months, years, permanently, and/or for other time periods), and/or other information related to storage of a batch of spirit. In some implementations, different sections of the distillery storage 44 may be configured to provide ideal environmental conditions to store certain types of batches, to store batches at specific production operations, and/or based on other conditions of a batch.

The transaction management module 190 may be configured to track transactions relating to customers, groups, and/or other entities, transactions related to the sale of spirits, transactions related to the storage of spirits, and/or other transactions related to the licensed distillery 40. The transaction management module 190 may be configured to track registration of customers, groups, and/or other entities with distillery management system 10, track the levels of customization associated with batches being produced, track the inventory maintained by the licensed distillery 40, track the storage of customer batches in the licensed distillery 40, and/or track other information related to customers, groups, batches, inventory, and/or other distillery information. The transaction management module 190 may require a customer and/or group to pay a different fee based on a type of spirit to be produced by the customer, a proof strength of the spirit, an aging time of the spirit, a number of different types of spirits to be produced by the customer, a level of customization associated with producing the spirit, a level of customer service provided by the licensed distillery 40, a number of visits to the licensed distillery 40, education provided by the licensed distillery 40 and/or the distillery management system 10, a number of batches produced, customized labeling of one or more casks, tanks, bottles, and/or other receptacles, and/or other factors related to production and customer service provided to a customer, group, and/or other entity. The transaction management module 190 may further include the appropriate functionality for receiving and processing payments from customers, groups, and/or other entities, including, for example, credit card payments, payments via third parties such as PayPal, electronic check processing, and/or other types of payments. In some implementations, the transaction management module 190 may be communicably operable with the distillery register/point of sale device 56.

The storage module 105 may be configured to store information related to system usage, customer information, and/or distillery content. For example, the storage module 105 may be configured to store information related to customers, groups, batches, inventory, transactions, and/or information related to the licensed distillery 40. The storage module 105 may further store content developed and/or shared via the distillery management system 10.

The reporting module 195 may be configured to facilitate analysis and report information related to system usage, customer information, and/or distillery content. The reporting module 195 may also be configured to produce statistics regarding the information related to system usage and/or distillery content and may be further configured to prepare and/or display reports including one or more parts of the information related to system usage and/or distillery content and any statistics regarding that information related to system usage and/or distillery content. For example, the reporting module 195 may prepare and/or display a report describing a batch of customized spirits based on a level of customization associated with customized spirit of the batch.

In some implementations, a customer, group, and/or other entity may schedule a visit to the licensed distillery 40 based on an event on the distillery calendar. For example, the event may comprise making a customized batch of a specific type of spirit. Upon scheduling the visit, the distillery management system 10 (e.g., the education module 160, the customization module 150, the batch management module 170, and/or other modules 103) may provide information to the customer, group, and/or other entity relating to producing the customized spirit, based on a level of customization associated with the customized spirit. In some implementations, when the distillery schedules a customized spirit producing event, the level of customization associated with the customized spirits being produced may be pre-determined by the licensed distillery 40. For example, the level of customization may comprise participation in the recipe creation for the customized spirit. In another example, the level of customization may comprise participation in the recipe creation and participation in one or more tastings of the customized spirit. In some implementations, the predetermined levels of customization available to a customer may differ from the predetermined levels of customization available to a group and/or other entity. Other levels of customization may also be used.

In some implementations, the level of customization during a customized spirit producing event may be selected or tailored by the respective customers, groups, and/or other entities attending the event. For example, when requesting to customize a spirit via the distillery management system 10, the distillery management system 10 may provide (e.g., via the education module 160, the customization module 150, and/or other modules 103) information about pre-determined levels of customization that comprise predefined levels of participation by a customer, group, and/or other entity. In some implementations, the distillery management system 10 may allow a customer, group, and/or other entity to tailor a level of customization. For example, the distillery management system 10 may allow a customer, group, and/or other entity to select a level of participation for one or more operations involved in producing the customized spirit, to select an amount of notifications provided, a type of notifications provided, times in the process at which notification is provided, a level of input in one or more operations, an amount of aging time, a proof strength, an amount of storage time, customized labels for one or more casks, tanks, bottles, and/or other receptacles to hold the customized spirit, and/or other customization.

In some implementations, the distillery management system 10 may maintain information and/or statistics regarding one or more interactions with a customer, group, and/or other entity. For example, the distillery management system 10 may maintain information including, for example, telephone calls, log ins to the portal/website, visits to the licensed distillery 40, appointments to participate in distillery events, and/or other information related to interactions of one or more customers, groups, and/or other entities.

In some implementations, the distillery management system 10 may facilitate the production, aging, and sale of distillery spirits. Distillery spirits may include, for example, spirits that are produced and aged without input from a customer, group, and/or other entity. For example, the distillery management system 10 may operate without receiving input or providing notification to a customer, group, and/or other entity during the production and aging of distillery spirits. In another example, instead of providing notifications and receiving input from a customer, group, and/or other entity, the distillery management system 10 may provide notifications and receive input from distillery staff.

In some implementations, the distillery management system 10 may maintain information regarding producing one or more spirits. The spirits may be spirits produced by the licensed distillery 40 and/or customized spirits produced with participation by one or more customers, groups, and/or other entities. The information may include, for example, data on the recipe used and conditions of creating the recipe (e.g., raw ingredients, enzymes used, starch conversion rate, temperate, and/or other information and conditions related to recipe creation), data on fermentation (e.g., fermentation of the wort, yeast used, sugar conversion rate, alcohol content, temperature, and/or other information and conditions related to fermentation), data on distillation (e.g., amount of distillate that runs through the stills, flow rate, introduction of one or more flavorings, introduction of one or more botanicals, temperature, pressure, reflux rates, water flow rates, condenser temperature, dephlegmator temperature, final product proof, product temperature, and/or other information and conditions related to distillation), data on head receipt (e.g., production time, still temperature, volume, flow, and/or other information and conditions related to head receipt), data on heart receipt (e.g., production time, still temperature, volume, flow, and/or other information and conditions related to heart receipt), data on tail receipt (e.g., production time, still temperature, volume, flow, and/or other information and conditions related to tail receipt), data on type of still used, data on number of plates using in the reflux column, data on filtering (e.g., filtering rate, addition of one or more botanicals, addition of one or more flavorings, and/or other information and conditions related to filtering), label information (e.g., customer information, production information, proof strength, alcohol content, flavorings, colorings, additives, amount of aging time, type of aging container used, whether wood chips or other wood products were used for coloring and aging, charring or toasting of wood, type of wood used, type of spirit, and/or other information related to labeling a cask, tank, bottle, and/or other storage unit comprising the spirit), storage of the spirit (e.g., customer information relating to a customized spirit, customer information relating to a batch of spirits produced by the licensed distillery 40 and purchased by the customer, spirit type, fill date, fill amount, fill proof, amount of aging, and/or other information related to storage of the spirit), data related to tasting (e.g., date of tasting, customers, groups, and/or other entities that tasted the cask, tank, bottle, and/or other storage unit of spirit, amount of samples, changes made based on tasting, reviews associated with the tasting, bottles removed, proof strength of spirit tasted, and/or other information related to a spirit tasting), and/or other information related to producing one or more spirits at the licensed distillery 40.

In some implementations, when the notification module 174 communicates a notification, the notification module 174 may also communicate a request for input relating to the notification. The processing module 172 may be configured to receive input relating to the notification. In some implementations, the input relating to the notification may be tied to a transaction associated with the licensed distillery 40. For example, when the notification module 174 communicates a notification that the aging time of the spirit is complete, the notification module 174 may also communicate a request for input relating to whether more aging time is requested. When the processing module 172 receives input request for a further amount of aging time for the spirit, the customer, group, and/or other entity sending the input may need to pay a fee for the extra aging time. Accordingly, the transaction management module 190 (as discussed below) may handle the transaction associated with buying an extra amount of aging time. When the transaction is confirmed (e.g., an invoice has been sent, payment has been received, payment has been schedule, and/or other type of confirmation), the processing module 172 may take action on the input (e.g., may extend the aging time associated with the spirit).

Figure 5:
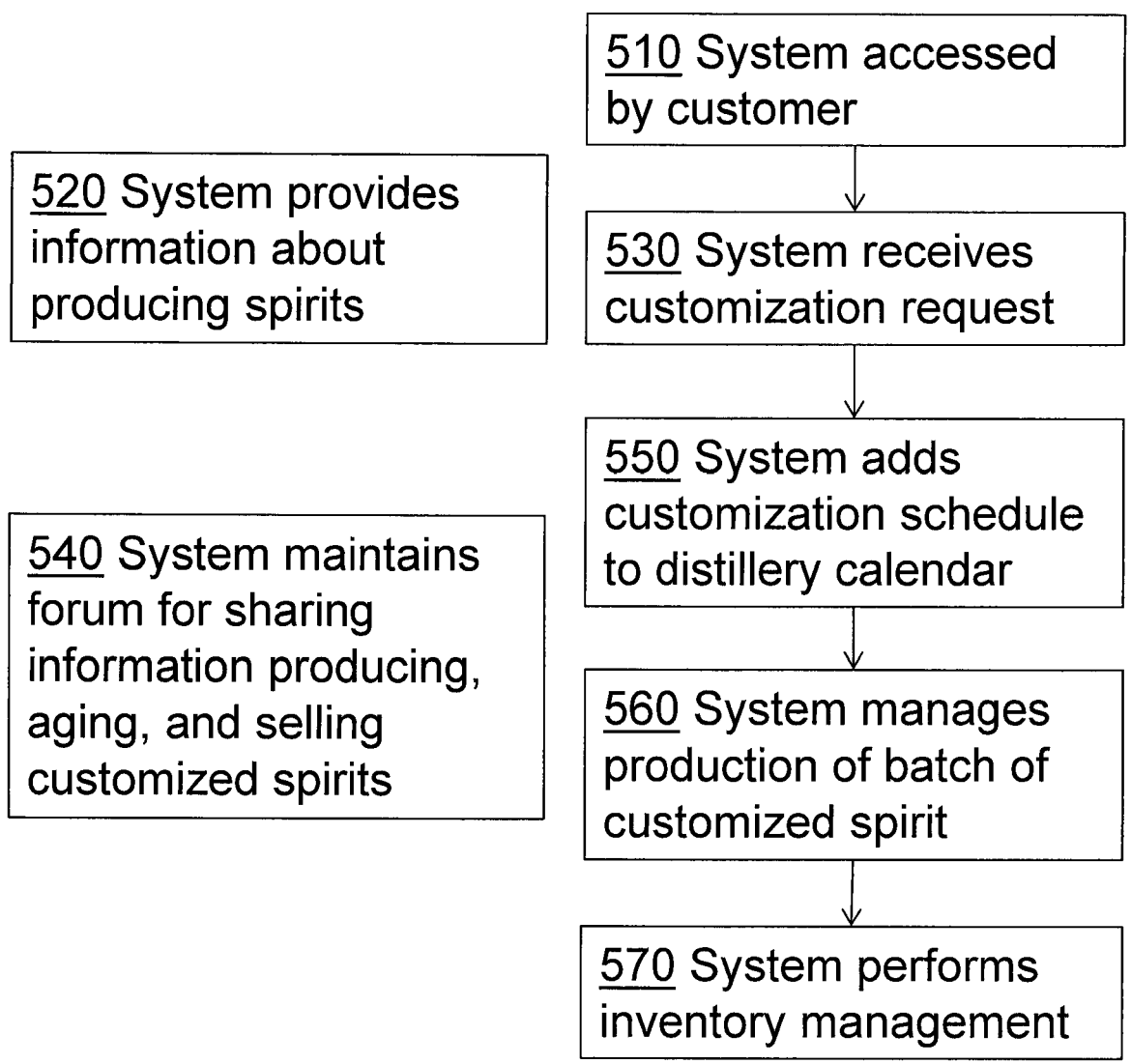
FIG. 5 illustrates an exemplary flowchart of producing, aging, and selling customized spirit, according to an aspect of the invention.

FIG. 5 illustrates a process for producing, aging, and selling customized spirits, according to an aspect of the invention. The described operations of FIG. 5 and other figures may be accomplished using some or all of the system components described in detail above and, in some implementations, various operations may be performed in different sequences. In other implementations, additional operations may be performed along with some or all of the operations shown in FIG. 5 and the other figures. In yet other implementations, one or more operations may be performed simultaneously. In yet other implementations, one or more combinations of various operations may be performed. Some implementations may not perform all of the operations described with relation to FIG. 5 and other figures. Accordingly, the operations described are exemplary in nature and, as such, should not be viewed as limiting.

In an operation 510, the system 10 may be accessed by a customer, group, and/or other entity. The system 10 may be accessed via, for example, a kiosk 52 at the licensed distillery 40, via an application that may be downloaded to a client device, via an application that may be accessed using a portable client device associated with the licensed distillery 40, via email, via a website or portal associated with the licensed distillery 40, via one or more staff members of the licensed distillery 40, and/or by other methods.

In an operation 520, the system 10 (e.g., the calendar management module 120, the customization module 150, the education module 160, the batch management module 170, the reporting module 195, and/or other modules) may provide information about producing spirits. This operation may be performed at any time before, during, or after the production, aging, or sale of spirits at the licensed distillery 40. The system 10 may provide information, for example, about producing spirits, producing customized spirits, recipes for producing customized spirits, tweaks to operations involved in producing customized spirits, photos, videos, notes and/or other materials related to producing customized spirits, ratings associated with different inputs provided during the production of a customized spirit, ratings associated with recipes for a type of spirit, ratings associated with different levels of customization, reviews associated with different inputs provided during the production of a customized spirit, reviews associated with recipes for a type of spirit, reviews associated with different levels of customization, how the batch is made, the recipe for the batch, potential changes available to the recipe for the batch, the processing status of one or more batches, available proofs, the aging process of a batch, one or more parameters related to how a batch is processed, a timeline for producing a batch, available times to visit the licensed distillery 40, events occurring at the licensed distillery 40, and/or other information available via the calendar management module 120, the education module 160, the customization module 150, the batch management module 170, the reporting module 195, and/or other modules.

In an operation 530, the system 10 (e.g., the customization module 150, and/or other modules) may receive a customization request from a customer, group, and/or other entity. For example, the customization module 150 of the system 10 may receive the customization request in a manner similar to that described above.

In an operation 540, the system 10 (e.g., the customization module 150, and/or other modules) may maintain an electronic forum for customers, groups, distillery staff, and/or other entities to share information related to producing, aging, or selling spirits, producing, aging, or selling customized spirits, and/or other information related to the licensed distillery 40. This operation may be performed at any time before, during, and/or after the production, aging, or sale of spirits at the licensed distillery 40. In some implementations, the forum may be maintained, for example, via a portal, web site, and/or other communication media.

In some implementations, the system 10 may facilitate the sharing of information via the forum. The information shared by customers, groups, and/or other entities may include, for example, recipes for producing customized spirits, tweaks to operations involved in producing customized spirits, photos, videos, notes and/or other materials related to producing customized spirits, ratings associated with different inputs provided during the production of a customized spirit, ratings associated with recipes for a type of spirit, ratings associated with different levels of customization, reviews associated with different inputs provided during the production of a customized spirit, reviews associated with recipes for a type of spirit, reviews associated with different levels of customization, and/or other information that a customer, group, and/or other entity may want to share via the forum. The system 10 may also facilitate the sharing of information of the forum via email, text, TWEET, blog post, social media post, and/or by other methods by which information may be shared. In some implementations, the system 10 may also facilitate instant messaging, group chats, video chats, and/or other methods of communication via the forum. In some implementations, the forum may be maintained in a manner similar to that described above with regard to the customization module 150.

In an operation 550, the system 10 (e.g., the calendar management module 120, and/or other modules) may add a customization schedule to the distillery calendar. In some implementations, the customization schedule may be added in response to receiving a customization request (e.g., via operation 430). In some implementations, the customization schedule may be added when an event is added to the distillery calendar, when registration is received for an event, when a batch of customized spirits is scheduled for production, and/or at other time relevant to producing a batch of customized spirits. For example, the licensed distillery 40 may schedule an event that includes the production, aging, and sale of a customized spirit. The level of customization associated with the customized spirit may be set. Accordingly, a schedule of operations, notifications, inputs, and/or other activities related to producing the customized spirit may be known, and the schedule may be added to the distillery calendar. In these implementations, the customization request may comprise registration by a customer, group, and/or other entity to attend the event.

In an operation 560, the system 10 (e.g., the batch management module 170 and/or other modules) may manage production of one or more batches of customized spirits. In some implementations, the system 10 (e.g., the processing module 172 of the batch management module 170, and/or other modules) may provide information regarding the operations for producing a customized spirit, may monitor the processing of the customized spirit, may provide recommendations regarding actions to be taken regarding the processing of the customized spirit to the system, the distillery staff, the customer, group and/or other entities associated with producing the customized spirit, may provide recommendations regarding actions to be taken regarding the processing of the customized spirit to the system, the distillery staff, the customer, group and/or other entities associated with producing the customized spirit, and/or may perform other functionality related to the processing of the customized spirit.

Figure 6:
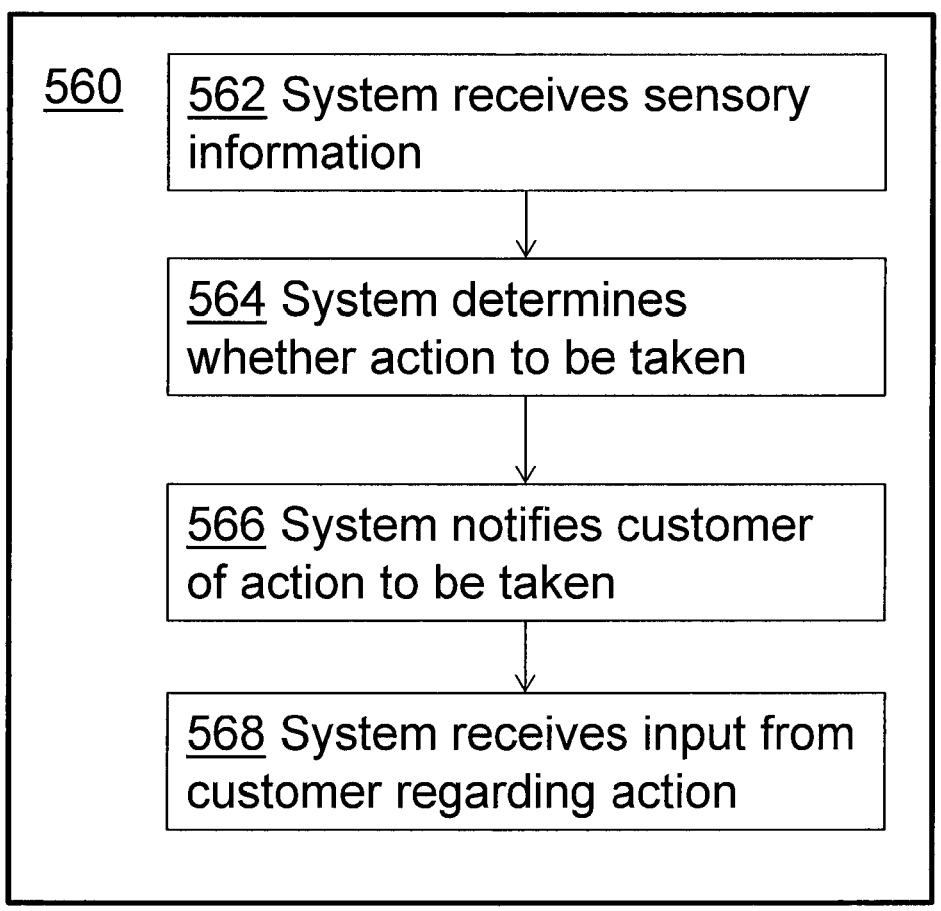
FIG. 6 illustrates an exemplary flowchart of managing production of a batch of customized spirits, according to an aspect of the invention.

As shown in FIG. 6, in some implementations, managing production of one or more batches of customized spirits may comprise one or more operations. In an operation 562, the system 10 (e.g., the processing module 172 of the batch management module 170, and/or other modules) may receive sensor information from the licensed distillery 40. For example, one or more sensors may be placed at the licensed distillery 40, at or near the distillery production components 42, at or near the distillery storage 44, and/or at other locations at the licensed distillery 40. The sensors may comprise one or more types of sensors including, for example, temperature sensors, alcohol sensors, humidity sensors, pressure sensors, flow sensors, and/or other types of sensors. The system 10 may receive sensor information from the sensors. In some implementations, the system 10 may receive the sensory information in a manner similar to the processing module 172 of the batch management module 170, as described above.

In an operation 564, the system 10 (e.g., the processing module 172 of the batch management module 170, and/or other modules) may determine whether action is recommended to occur relating to the production of the customized spirit. In some implementations, the system 10 may use the sensor information received from the one or more sensors to determine whether action is recommended to occur relating to the production of the customized spirit. In some implementations, the system 10 may determine whether action is to be taken based on a comparison of conditions related to the batch stored at the storage module 105 relating to the operations involved in producing the customized spirit. In some implementations, the system 10 may determine whether an action is to be taken regarding the production of the one or more batches of customized spirit in a manner similar to the processing module 172 of the batch management module 170, as described above.

In an operation 566, the system 10 (e.g., the notification module 174 of the batch management module 170, and/or other modules) may notify the customer, group, and/or other entity of the action to be taken. For example, the system 10 may notify the customer regarding the action to be taken, may request input from the customer, group, and/or other entity regarding the action to the taken, and/or may otherwise communicate information relating to the action to be taken to the customer, group, and/or other entity. The notification may be done, for example, via email, text message, the portal/website associated with the licensed distillery 40, a customer account associated with the licensed distillery 40, postal mail, telephone call, social media post, TWEET, and/or other method of communication.

In an operation 568, the system 10 (e.g., the processing module 172 of the batch management module 170, and/or other modules) may receive input from the customer, group, and/or other entity related to the action to be taken. The system 10 may perform processing based on the input received. For example, the system 10 may receive input relating to whether the customer, group, and/or other entity wants to participate in a tasting. When the customer, group, and/or other entities communicates a desire to participate, the system 10 (e.g., the calendar management module 120) may schedule a tasting at the licensed distillery 40 and may send an invitation to the customer, group, and/or entity. Production of the batch of customized spirits may also be temporarily suspended until the tasting occurs.

Other operations may also occur during production of the one or more batches of customized spirit. In some implementations, the system 10 may manage production of one or more batches of customized spirits in a manner similar to that described above with regard to the batch management module 170.

Figure 7:
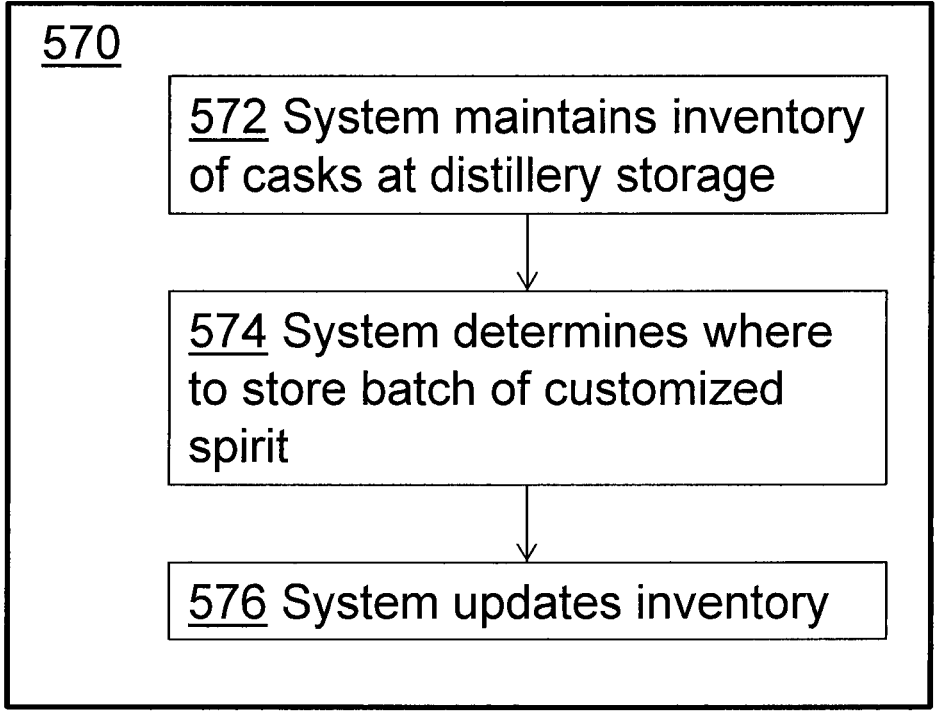
FIG. 7 illustrates an exemplary flowchart of performing inventory management, according to an aspect of the invention.

Returning to FIG. 5, in an operation 570, the system 10 (e.g., the inventory management module 180, and/or other modules) performs inventory management. In some implementations, the system 10 may determine where in the distillery storage 44 to store batches of customized spirit, batches of spirits made by the licensed distillery 40, and/or other batches of spirits As shown in FIG. 7, in some implementations, performing inventory management may comprise one or more operations. In an operation 572, the system 10 (e.g., the inventory management module 180, the storage module 105, and/or other modules) may maintain inventory information related to the casks stored at the distillery storage 44. For example, the system 10 may associate casks, tanks, bottles, and/or other receptacles with customers, may associate casks, thanks, bottles, and/or other receptacles with batches, may associate casks, tanks, bottles, and/or other receptacles with customized labels, may maintain a location of one or more casks, tanks, bottles, and/or other receptacles, may maintain environmental conditions to be associated with one or more casks, tanks, bottles, and/or other receptacles, and/or may otherwise maintain inventory information for one or more casks, tanks, bottles, and/or other receptacles. In some implementations, the system 10 (e.g., the storage module 105) may receive inventory information for a batch of casks, tanks, bottles, and/or other receptacles. The inventory information may include, for example, a number of casks, tanks, bottles, and/or other receptacles in the batch, a location associated with one or more casks, tanks, bottles, and/or other receptacles in the batch, any environmental conditions to consider for one or more casks, tanks, bottles, and/or other receptacles in the batch, an aging time for one or more casks, tanks, bottles, and/or other receptacles in the batch, a proof strength for one or more casks, tanks, bottles, and/or other receptacles in the batch, whether any of the casks, tanks, bottles, and/or other receptacles are to be displayed, and/or other inventory information relating to the batch. In some implementations, the system 10 may store information relating to inventory stored at the distillery storage 44. In some implementations, the system 10 may maintain inventory information related to the casks, tanks, bottles, and/or other receptacles stored at the distillery storage 44 in a manner similar to the inventory management module 180, as described above.

In an operation 574, the system 10 (e.g., the inventory management module 180, and/or other modules) may determine where to store a batch of customized spirits. The system 10 may determine where to store various batches of spirits based on, for example, where space is available, a desired location of the customer or client, ideal environmental conditions for the batch (e.g., based on type of spirit, status of production of the spirit, and/or other factors), length of storage of the batch (e.g., weeks, months, years, permanently, and/or for other time periods), and/or other information related to storage of a batch of spirit. In some implementations, different sections of the distillery storage 44 may be configured to provide ideal environmental conditions to store certain types of batches, to store batches at specific production operations, and/or based on other conditions of a batch. In some implementations, the system 10 may determine that one or more casks, tanks, bottles, and/or other receptacles should be stored as part of a display. The display may be at the licensed distillery 40 (e.g., at the distillery front end 50, at the distillery storage 44, and/or at other locations at the licensed distillery 40) and/or at another location associated with the distillery. The system 10 may determine that one or more casks, tanks, bottles, and/or other receptacles should be stored as part of a display based on, for example, information related to the spirit stored in the one or more casks, tanks, bottles, and/or other receptacles. The information related to the spirit may include, for example, rareness of the spirit, age of the spirit, an amount of time before the spirit is undrinkable, popularity of the spirit, uniqueness of the spirit, and/or other information related to the spirit.

In an operation 576, the system 10 (e.g., the inventory management module 180, the storage module 105, and/or other modules) may update the inventory information maintained by the system 10. For example, the system 10 may receive inventory information for the batch. The inventory information may include, for example, a number of casks, tanks, bottles, and/or other receptacles in the batch, a location associated with one or more casks, tanks, bottles, and/or other receptacles in the batch, any environmental conditions to consider for one or more casks, tanks, bottles, and/or other receptacles in the batch, an aging time for one or more casks, tanks, bottles, and/or other receptacles in the batch, a proof strength for one or more casks, tanks, bottles, and/or other receptacles in the batch, whether any of the casks, tanks, bottles, and/or other receptacles are displayed, and/or other inventory information relating to the batch.

Figure 8A:
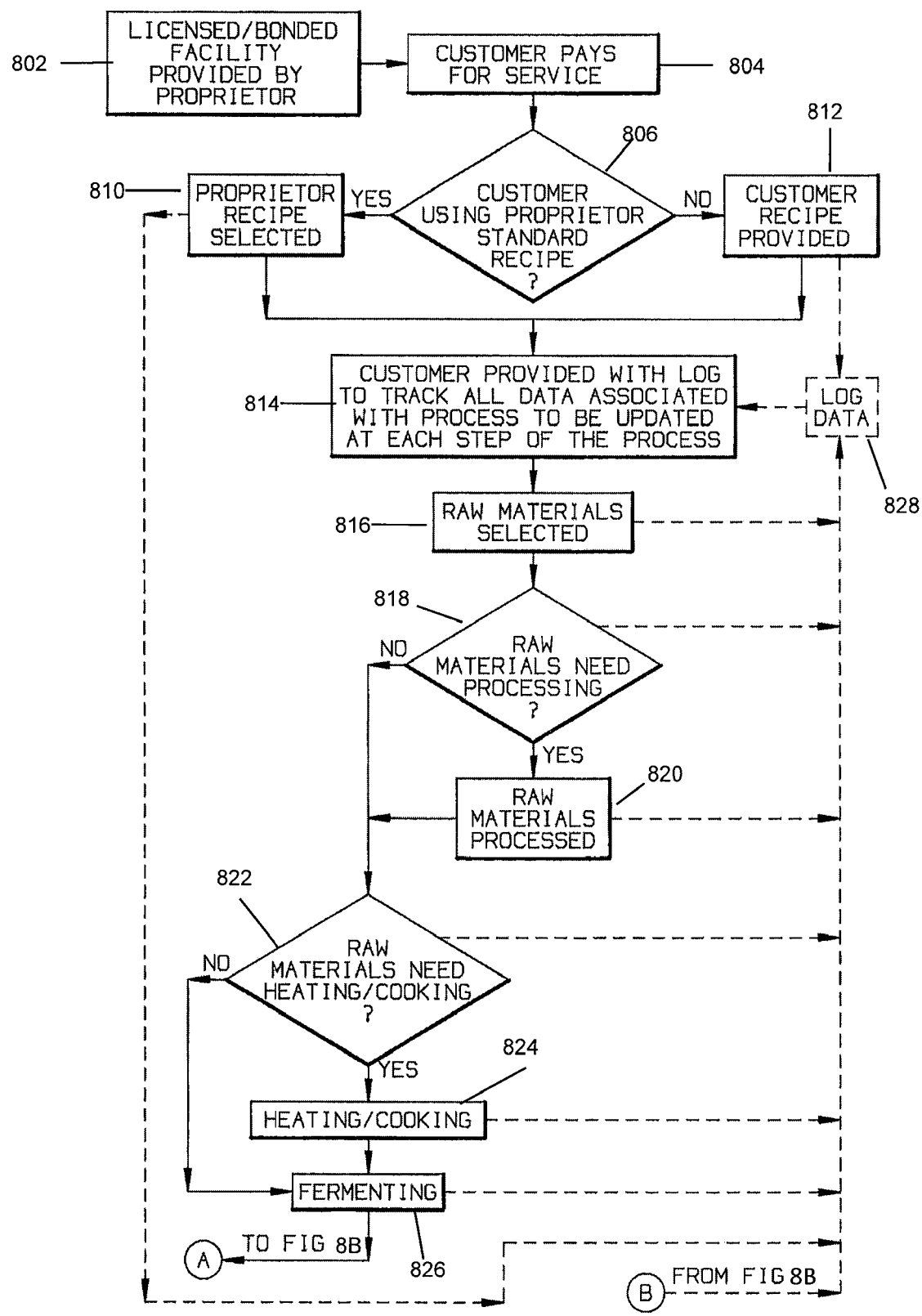
FIGS. 8A and 8B illustrate an exemplary flowchart of producing, aging, and selling customized spirit, according to an aspect of the invention.
Figure 8B:
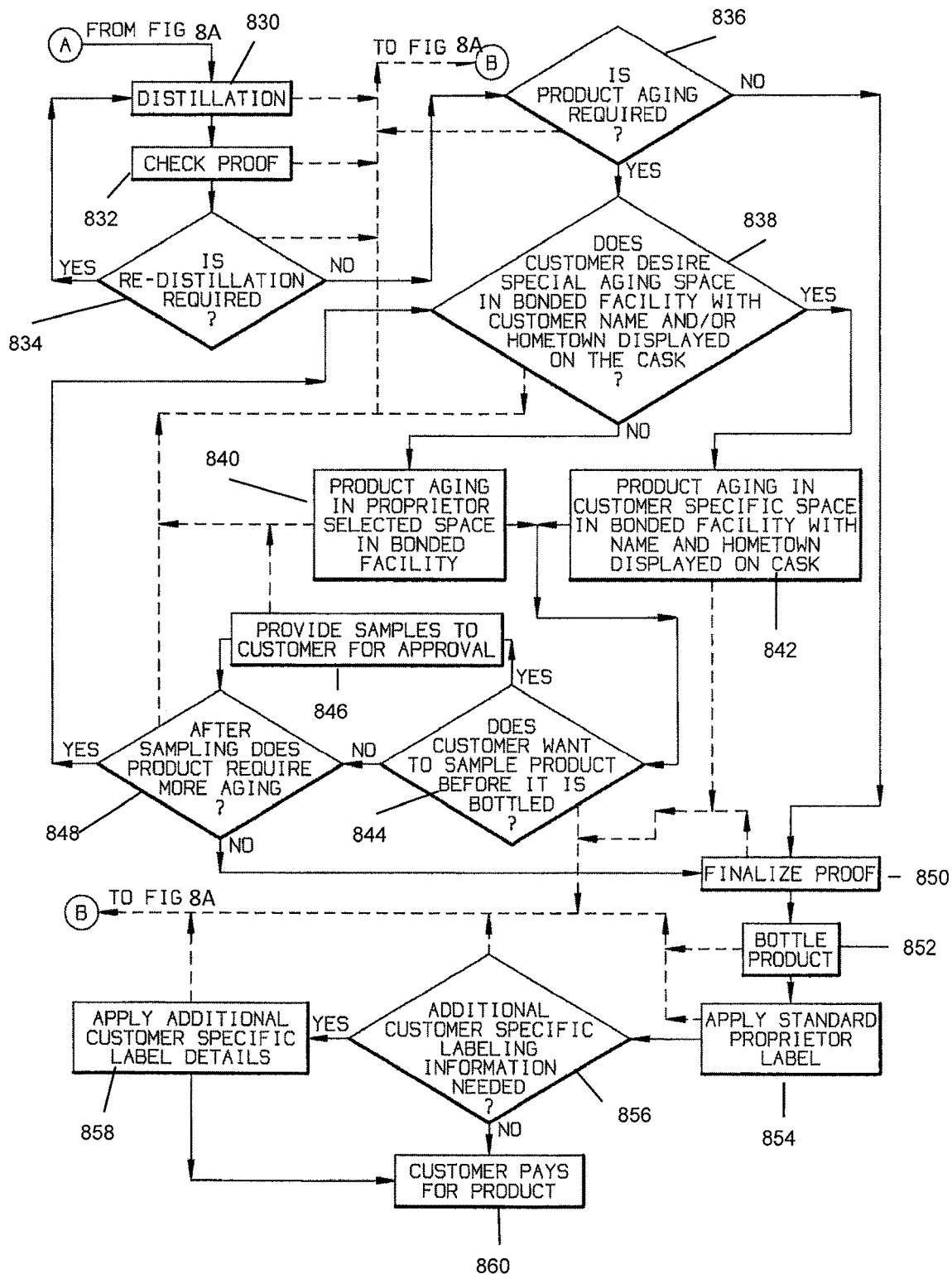

FIGS. 8A and 8B illustrate an exemplary flowchart for producing, aging, and selling customized spirits, according to an aspect of the invention. One or more of the operations described in relation to FIGS. 8A and 8B may be implemented and/or facilitated by various components of the licensed distillery 40 and/or the system 10 for automated distillery management.

In an operation 802, the licensed distillery (e.g., a licensed/bonded facility) may be provided by the proprietor of the licensed distillery 40. In an operation 804, a customer may pay for service. For example, the customer may pay to participate in creation of a customized spirit. In an operation 806, a determination is made as to whether the customer is using the proprietor standard recipe. For example, this determination may be made based on a level of customization associated with the customized spirit to be produced. When the customer is using the standard recipe, the proprietor recipe may be selection in an operation 810. In an operation 812, when the customer is not using the standard recipe, a customer recipe may be provided. In an operation 814, the customer may be provided with a log to track all data associated with the process of producing the customized spirit, where the data in the log may be updated with each step of the process. For example, in an operation 828, data associated with each of the operations may be logged. In some implementations, the data being logged may be the same or similar to a customer profile being updated or data being stored at the distillery management system 10.

In an operation 816, raw materials for the customized spirit may be selected. In an operation 818, a determination is made as to whether the raw materials need processing. When the raw materials need processing, in an operation 820, the raw materials are processed. When the raw materials do not need processing, or when processing of the raw materials is complete, in an operation 822, a determination is made as to whether the raw materials need heating or cooking. When the raw materials need heating or cook, the raw materials are heated and/or cooked in an operation 824. When the raw materials do not need heating and/or cooking, or when heating and/or cooking of the raw materials is complete, fermenting occurs in an operation 826. In an operation 830, distillation may occur. In an operation 832, spirit proof may be checked. In an operation 834, a determination may be made as to whether re-distillation is required. If re-distillation is required, in an operation 830, distillation may occur again. For example, if a level of customization specifies a specific proof and the proof the customized spirit is different from the specific proof, distillation may occur again. If re-distillation is not required, in an operation 836, a determination is made as to whether product aging is required. When aging is required, a determination is made as to whether the customer desires special aging space in the bonded facility with customer name and/or hometown displayed on the cask, in an operation 838. Other customizations may be done to the label for the cask. Other locations may be chosen for storing the spirit for aging. When the special aging space is not desired, in an operation 840, the product may be aged in proprietor selected space in bonded facility. In some implementations, the space may be selected by the distillery management system 10. When special aging space is requested, product aging may be done in a customer specific space in the bonded facility (e.g., distillery storage 44) with name and hometown displayed on the associated stored cask in an operation 842.

In an operation 844, a determination may be made as to whether the customer wants to sample the product before it is bottled. When the customer wants to sample the product, in an operation 846, samples may be provided to the customer for approval. When the customer does not want to sample the product or when the customer has completed sampling of the product, in an operation 848, a determination may be made as to whether the product requires further aging after sampling. When the product requires further aging, flow may return to operation 838. When the product does not need more aging, the proof of the product may be finalized in an operation 850. The customized product may be bottled in an operation 852. A standard proprietor label may be applied to the bottle in an operation 854. In an operation 856, a determination as to whether additional customer specific labeling information is needed. When additional labeling is needed, in an operation 858, additional customer specific labels may be applied. When additional labeling is not needed or when the additional customer specific labels have been applied, the customer may pay for the product in an operation 860.

Other operations may also occur during inventory management by the system 10. In some implementations, the system 10 may perform inventory management of one or more batches of customized spirits in a manner similar to that described above with regard to the inventory management module 180.

The system 10 may have one or more components that reside at the distillery 40, at the distillery storage 44, at an off-site location, at a virtual location, and/or at other locations. The computing device 100 may be any computing device such as, for example, a server, a desktop computer, laptop computer, personal digital assistant, smart phone, gaming console, and/or any other computing device. Computing device 100 may include a storage module 105, one or more processors 101, and/or other components. Illustration of computing device 100 in FIG. 1 is not intended to be limiting.

Computing device 100 may include a plurality of hardware, software, and/or firmware components operating together to provide the functionality attributed herein to computing device 100. For example, computing device 100 may be implemented by a cloud of computing platforms operating together as computing device 100. Other configurations and system architectures may be used. For example, computing device 100 may be or include one or more servers connected to one or more client computing devices 30 via a network 20 such as a Wide Area Network, Local Area Network, the Internet, a cloud-based network and/or other network or combination thereof. The computing device 100 may be capable of communicating with network 20, one or more client computing devices 30, and/or one or more other devices.

Processor(s) 101 may provide information processing capabilities within computing device 100. As such, processor 101 may include one or more of a digital processor, an analog processor, a digital circuit designed to process information, an analog circuit designed to process information, a state machine, and/or other mechanisms for electronically processing information. Although processor 101 is shown in FIG. 1 as a single entity, this is not intended to be limiting, as processor 101 may include a plurality of processors operating in coordination or cooperation. This may include implementations in which computing device 100 includes a multi-processor device, a farm of server devices operating together, and/or virtual resources provided by the cloud. The processor 101 may be configured to execute modules 110, 120, 130, 140, 150, 160, 170, 180, 190, 195, and/or 103. Processor 101 may be configured to execute modules 110, 120, 130, 140, 150, 160, 170, 180, 190, 195, and/or 103 by software, hardware, firmware, some combination of software, hardware, and/or firmware, and/or other mechanisms for configuring processing capabilities on processor 101.

It should be appreciated that although modules 110, 120, 130, 140, 150, 160, 170, 180, 190, 195, and/or 103 are illustrated in FIG. 1 as being co-located within a single computing device, in implementations in which processor 101 includes multiple processing units, one or more of modules 110, 120, 130, 140, 150, 160, 170, 180, 190, 195, and/or 103 may be located remotely from the other modules. The description of the functionality provided by the different modules 110, 120, 130, 140, 150, 160, 170, 180, 190, 195, and/or 103 described below is for illustrative purposes, and is not intended to be limiting, as any of modules 16, 18, 20, 22, 24, 26, and/or 28 may provide more or less functionality than is described. For example, one or more of modules 110, 120, 130, 140, 150, 160, 170, 180, 190, 195, and/or 103 may be eliminated, and some or all of its functionality may be provided by other ones of modules 110, 120, 130, 140, 150, 160, 170, 180, 190, 195, and/or 103. As another example, processor 101 may be configured to execute one or more additional modules that may perform some or all of the functionality attributed below to one of modules 110, 120, 130, 140, 150, 160, 170, 180, 190, 195, and/or 103.

The storage module 105 may comprise electronic storage media that electronically stores information non-transiently. The electronic storage media of storage module 105 may include one or both of system storage that is provided integrally (i.e., substantially non-removable) with computing device 100 and/or removable storage that is removably connectable to computing device 100 via, for example, a port (e.g., a USB port, a firewire port, etc.) or a drive (e.g., a disk drive, etc.). The storage module 105 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The storage module 105 may include one or more virtual storage resources (e.g., cloud storage, a virtual private network, and/or other virtual storage resources). The storage module 105 may store software algorithms, information determined by processor 101, information received from computing device 100, information received from client computing devices 30, and/or other information that enables computing device 100 to function as described herein.

In some implementations, the storage module 105 may comprise at least one database that stores system data such as information related to system usage, customer information, distillery content, and/or other data. The storage module 105 may be associated and communicate with the computing device 100. For example, the one or more databases comprising the storage module 105 may be, include, or interface to, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some implementations, the storage module 105 may be part of or hosted by a computing device on the network 20. In some implementations, the storage module 105 may be part of or hosted by the computing device 100. In some implementations, the storage module 105 may be physically separate from the computing device 100 but may be operably communicable therewith.

The kiosk 52 may be a conventional computing device that includes one or more physical processors configured to execute computer program modules. The kiosk 52 may include an interactive display, one or more user input mechanisms, hardware and/or software configured to make the kiosk operable, and/or other components. The kiosk 52 may be capable of communicating with network 20, computing device 100, the storage module 105, client computing device 30, distillery computing device 54, and/or other devices.

The distillery computing device 54 may be a conventional portable computing device that includes one or more physical processors configured to execute computer program modules. By way of non-limiting example, the distillery computing device 54 may include one or more of a server, desktop computer, a laptop computer, a handheld computer, a tablet computing platform, a NetBook, a Smartphone, a gaming console, and/or other computing platforms. The distillery computing device 54 may be capable of communicating with network 20, computing device 100, the storage module 105, client computing device 30, kiosk 52, and/or other devices.

The register/point of sale device 56 may be a conventional point of sale device that includes one or more physical processors configured to execute computer program modules. The register/point of sale device 56 may be capable of communicating with network 20, computing device 100, transaction management module 190, storage module 105, client computing device 30, kiosk 52, and/or other devices. In some implementations, the register/point of sale device 56 may comprise a printer, may be communicably operable with a printer, and/or may otherwise enable the printing of material.

The client computing device 30 may include one or more physical processors configured to execute computer program modules. By way of non-limiting example, the client computing device 30 may include one or more of a server, desktop computer, a laptop computer, a handheld computer, a tablet computing platform, a NetBook, a Smartphone, a gaming console, and/or other computing platforms. The client computing device 30 may be capable of communicating with network 20, computing device 100, the storage module 105, and/or other devices.

In addition, implementations of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations described herein as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A system for automated distillery management to produce customized spirits at a distillery on behalf of, and based on customization specified by, distillery customers, the system comprising a computing device having one or more physical processors programmed to execute computer program modules, the computer program modules comprising:

a distillery customer management module configured to maintain a set of distillery customer profiles for distillery customers based on profile information received from the distillery customers and subsequent interactions with the system by the distillery customers;

a distillery calendar management module configured to maintain a calendar for the distillery including information related to production schedules for customized batches of spirits and distillery customer activity event information related to participation by the distillery customers in the production of the customized batches of spirits;

a role-based permissions module configured to maintain individual roles, including at least system-based roles and batch-based roles, where the system-based roles are associated with one or more distillery administrators, and the batch-based roles are associated with distillery customer profiles for specific batches;

a batch customization module configured to receive batch customization requests from the distillery customers, wherein the batch customization requests include at least a first batch customization request from a first distillery customer comprising information specifying a first customized spirit to be produced on behalf of the first distillery customer in accordance with the first batch customization request and a second batch customization request from a second distillery customer comprising information specifying a second customized spirit to be produced on behalf of the second distillery customer in accordance with the second batch customization request;

a batch management module configured to determine recipes for producing customized spirits based on the batch customization requests received from the distillery customers and manage production of the customized batches of spirits in the distillery on behalf of the distillery customers, wherein to manage production of the first customized spirit on behalf of the first distillery customer and manage production of the second customized spirit on behalf of the second distillery customer, the batch management module is configured to:

obtain information regarding the production of the first customized spirit for the first distillery customer and information regarding the production of the second customized spirit for the second distillery customer, wherein the information regarding the production of the first customized spirit comprises at least a first condition specified by a first recipe determined by the batch management module based on the first batch customization request and the information regarding the production of the second customized spirit comprises at least a second condition specified by a second recipe determined by the batch management module based on the second batch customization request, wherein the first condition relates to at least a first distillation operation of a plurality of distillation operations to occur to produce the first customized spirit in accordance with the first recipe;

monitor at least the first distillation operation of the plurality of distillation operations, wherein the first distillation operation is necessary to produce the first customized spirit;

obtain first sensor information, from at least a first sensor in the distillery, that indicates a current condition associated with the first distillation operation based on the monitored first distillation operation;

compare the current condition to the first condition specified by the first recipe;

determine, without user input, that the current condition is acceptable based on the comparison;

determine, without user intervention, a recommendation to proceed to a second distillation operation specified by the first recipe based on the determination that the current condition indicated by the first sensor is acceptable; and provide a notification to the first distillery customer to schedule participation in the second distillation operation responsive to the determination of the recommendation to proceed to the second distillation operation;

an inventory management module configured to determine a location at the distillery at which to store at least the first customized spirit for the first distillery customer based on one or more of space available at the distillery, environmental conditions associated with the customized spirits, or length of storage; and a transaction management module configured to process payment by the first distillery customer and/or one or more other distillery customers for the first customized spirit produced on behalf of the first distillery customer based on the first batch customization request.

2. The system of claim 1, wherein the distillery calendar management module is configured to:

schedule, via the calendar for the distillery, a plurality of distillation operations at the distillery, wherein the plurality of distillation operations are necessary to produce at least the first customized spirit based on the first recipe and the second customized spirit based on the second recipe, the plurality of distillation operations including at least the first distillation operation.

3. The system of claim 2, wherein the distillery calendar management module is configured to:

receive registration for a distillation operation of the plurality of distillation operations from the first distillery customer, wherein the distillation operation is associated with a first level of customization, and wherein the level of customization associated with the production of the first customized spirit comprises the first level of customization associated with the distillation operation.

4. The system of claim 1, wherein the computer program modules further comprise an education module, wherein the education module is configured to:

provide education related to producing a spirit, wherein the education comprises information related to one or more of:

one or more recipes for the spirit,
production information for one or more types of spirits,
one or more available levels of customization for the spirit, or
a timeline for producing the spirit.

5. The system of claim 1, wherein the distillery customer management module is configured to:
maintain an electronic forum for sharing information related to producing spirits;
receive, from one or more distillery customers, content for the electronic forum, the content comprising one or more of:
a recipe for producing customized spirits,
a tweak to an action to be performed during production of the customized spirit,
a photo,
a video,
multimedia content related to producing a customized spirit,
a rating associated with an input provided during production of a customized spirit,
a rating associated with a recipe for a type of spirit,
a rating associated with a level of customization,
a review associated with an input provided during production of a customized spirit,
a review associated with a recipe for a type of spirit, or
a review associated with a level of customization.

6. The system of claim 1, wherein the inventory management module is configured to:
store an indication of the location at the distillery of the first customized spirit in association with the first distillery customer.

7. The system of claim 1, wherein the plurality of distillation operations include at least one of:
selection of type of still equipment used,
distillation,
selection of batch or continuous distillation method,
selection of number of times of distillation,
selection of number of times of redistillation,
selection of reflux ratio,
selection of the number and types of plates used in a tower configuration,
selection of the type of metal used in the still,
condensation,
head receipt,
heart receipt, or
tail receipt.

8. The system of claim 1, wherein the batch management module is configured to:
provide information that indicates how to perform an action relating to the second distillation operation.

9. A computer-implemented method of automated distillery management to produce customized spirits at a distillery on behalf of, and based on customization specified by, distillery customers, the method being implemented on a computing device having one or more physical processors programmed by computer program instructions that, when executed by the one or more physical processors, program the computing device to perform the method, the method comprising:
obtaining, by the computing device, information regarding the production of a first customized spirit for a first distillery customer and information regarding the production of a second customized spirit for a second distillery customer, wherein the information regarding the production of the first customized spirit comprises at least a first condition specified by a first recipe based on a first batch customization request received from the first distillery customer and the information regarding the production of the second customized spirit comprises at least a second condition specified by a second recipe based on a second batch customization request received from the second distillery customer, wherein the first condition relates to at least a first distillation operation of a plurality of distillation operations necessary to produce the first customized spirit in accordance with the first recipe;
monitoring, by the computing device, at least the first distillation operation of the plurality of distillation operations;
obtaining, by the computing device, first sensor information, from at least a first sensor in the distillery, that indicates a current condition associated with the first distillation operation based on the monitored first distillation operation;
comparing, by the computing device, the current condition to the first condition specified by the first recipe;
determining, by the computing device without user input, that the current condition is acceptable based on the comparison;
determining, by the computing device, without user intervention, a recommendation to proceed to a second distillation operation specified by the first recipe based on the determination that the current condition indicated by the first sensor is acceptable;
providing, by the computing device, a notification to the first distillery customer to schedule participation in the second distillation operation responsive to the determination of the recommendation to proceed to the second distillation operation;
determining, by the computing device, a location at the distillery at which to store at least the first customized spirit for the first distillery customer based on one or more of space available at the distillery, environmental conditions associated with the customized spirits, or length of storage; and
processing, by the computing device, payment by the first distillery customer and/or one or more other distillery customers for the first customized spirit produced on behalf of the first distillery customer based on the first batch customization request.

10. The method of claim 9, the method further comprising:
scheduling, by the computing device via a calendar for the distillery, a plurality of distillation operations at the distillery, wherein the plurality of distillation operations are necessary to produce at least the first customized spirit based on the first recipe and the second customized spirit based on the second recipe, the plurality of distillation operations including at least the first distillation operation.

11. The method of claim 10, the method further comprising:
receiving, by the computing device, registration for a distillation operation of the plurality of distillation operations from the first distillery customer, wherein the distillation operation is associated with a first level of customization and wherein the level of customization associated with the production of the first customized spirit comprises the first level of customization associated with the distillation operation.

12. The method of claim 9, the method further comprising:

providing, by the computing device, education related to producing a spirit, wherein the education comprises information related to one or more of:
  one or more recipes for the spirit,
  production information for one or more types of spirits,
  one or more available levels of customization for the spirit, or
  a timeline for producing the spirit.

13. The method of claim 9, the method further comprising:
  maintaining, by the computing device, an electronic forum for sharing information related to producing spirits;
  receiving, by the computing device, content for the electronic forum from one or more distillery customers, the content comprising one or more of:
    a recipe for producing customized spirits,
    a tweak to an action to be performed during production of the customized spirit,
    a photo,
    a video,
    multimedia content related to producing a customized spirit,
    a rating associated with an input provided during production of a customized spirit,
    a rating associated with a recipe for a type of spirit,
    a rating associated with a level of customization,
    a review associated with an input provided during production of a customized spirit,
    a review associated with a recipe for a type of spirit, or
    a review associated with a level of customization.

14. The method of claim 9, the method further comprising:
  storing, by the computing device, an indication of the location at the distillery of the first customized spirit in association with the first distillery customer.

15. The method of claim 9, wherein the plurality of distillation operations includes at least one of:
  selection of type of still equipment used,
  distillation,
  selection of batch or continuous distillation method,
  selection of number of times of distillation,
  selection of number of times of redistillation,
  selection of reflux ratio,
  selection of the number and types of plates used in a tower configuration,
  selection of the type of metal used in the still,
  condensation,
  head receipt,
  heart receipt, or
  tail receipt.

16. A non-transitory electronic storage media for automated distillery management to produce customized spirits at a distillery on behalf of, and based on customization specified by, distillery customers, the electronic storage media storing computer program modules, the computer program modules comprising:
  a distillery customer management module configured to maintain a set of distillery customer profiles for distillery customers based on profile information received from the distillery customers and subsequent interactions with the system by the distillery customers;
  a distillery calendar management module configured to maintain a calendar for the distillery including information related to production schedules for customized batches of spirits and distillery customer activity event information related to participation by the distillery customers in the production of the customized batches of spirits;
  a role-based permissions module configured to maintain individual roles, including at least system-based roles and batch-based roles, where the system-based roles are associated with one or more distillery administrators, and the batch-based roles are associated with distillery customer profiles for specific batches;
  a batch customization module configured to receive batch customization requests from the distillery customers, wherein the batch customization requests include at least a first batch customization request from a first distillery customer comprising information specifying a first customized spirit to be produced on behalf of the first distillery customer in accordance with the first batch customization request and a second batch customization request from a second distillery customer comprising information specifying a second customized spirit to be produced on behalf of the second distillery customer in accordance with the second batch customization request;
  a batch management module configured to determine recipes for producing customized spirits based on the batch customization requests received from the distillery customers and manage production of the customized batches of spirits in the distillery on behalf of the distillery customers, wherein to manage production of the first customized spirit on behalf of the first distillery customer and manage production of the second customized spirit on behalf of the second distillery customer, the batch management module programs a computing device to:
    obtain information regarding the production of the first customized spirit for the first distillery customer and information regarding the production of the second customized spirit for the second distillery customer, wherein the information regarding the production of the first customized spirit comprises at least a first condition specified by a first recipe determined by the batch management module based on the first batch customization request and the information regarding the production of the second customized spirit comprises at least a second condition specified by a second recipe determined by the batch management module based on the second batch customization request, wherein the first condition relates to at least a first distillation operation of a plurality of distillation operations to occur to produce the first customized spirit in accordance with the first recipe;
    monitor at least the first distillation operation of the plurality of distillation operations, wherein the first distillation operation is necessary to produce the first customized spirit;
    obtain first sensor information, from at least a first sensor in the distillery, that indicates a current condition associated with the first distillation operation based on the monitored first distillation operation;
    compare the current condition to the first condition specified by the first recipe;
    determine, without user input, that the current condition is acceptable based on the comparison;
    determine, without user intervention, a recommendation to proceed to a second distillation operation specified by the first recipe based on the determination that the current condition indicated by the first sensor is acceptable; and provide a notification to the first distillery customer to schedule participation in the second distillation operation responsive to the determination of the recommendation to proceed to the second distillation operation;

an inventory management module configured to determine a location at the distillery at which to store at least the first customized spirit for the first distillery customer based on one or more of space available at the distillery, environmental conditions associated with the customized spirits, or length of storage; and a transaction management module configured to process payment by the first distillery customer and/or one or more other distillery customers for the first customized spirit produced on behalf of the first distillery customer based on the first batch customization request.

17. The non-transitory electronic storage media of claim 16, wherein the plurality of distillation operations includes at least one of:
 selection of type of still equipment used,
 distillation,
 selection of batch or continuous distillation method,
 selection of number of times of distillation,
 selection of number of times of redistillation,
 selection of reflux ratio,
 selection of the number and types of plates used in a tower configuration,
 selection of the type of metal used in the still,
 condensation,
 head receipt,
 heart receipt, or
 tail receipt.

18. A retail facility licensed to produce distilled spirits and through which multiple distillery customers participate in the production of customized spirits, the facility comprising:
 one or more distillery components configured to produce distilled spirits and to produce customized spirits with customer participation;
 a distillery storage configured to store one or more spirits produced by the facility and one or more receptacles of customized spirits produced with participation by a first distillery customer of the distillery customers;
 one or more first computing devices disposed at the retail facility, the one or more first computing devices each comprising one or more physical processors programmed by computer program instructions that, when executed by the one or more first physical processors, program the one or more first computing devices to:
  receive batch customization requests from the distillery customers, wherein the batch customization requests include at least a first batch customization request from the first distillery customer comprising information specifying a first customized spirit to be produced on behalf of the first distillery customer in accordance with the first batch customization request and a second batch customization request from a second distillery customer comprising information specifying a second customized spirit to be produced on behalf of the second distillery customer in accordance with the second batch customization request; and
 a backend computing device communicably coupled to the one or more first computing devices, the backend computing device comprising one or more physical processors programmed by computer program instructions that, when executed by the one or more physical processors, program the backend computing device to:
  obtain information regarding the production of the first customized spirit for the first distillery customer and information regarding the production of the second customized spirit for the second distillery customer, wherein the information regarding the production of the first customized spirit comprises at least a first condition specified by a first recipe based on the first batch customization request and the information regarding the production of the second customized spirit comprises at least a second condition specified by a second recipe for creating the second customized spirit for the second distillery customer based on the second batch customization request, wherein the first condition relates to at least a first distillation operation of a plurality of distillation operations necessary to produce the first customized spirit in accordance with the first recipe;
  monitor at least the first distillation operation of the plurality of distillation operations;
  obtain first sensor information, from at least a first sensor in the retail facility, that indicates a current condition associated with the first distillation operation based on the monitored first distillation operation;
  compare the current condition to the first condition specified by the first recipe;
  determine, without user input, that the current condition is acceptable based on the comparison;
  determine, without user intervention, a recommendation to proceed to a second distillation operation specified by the first recipe based on the determination that the current condition indicated by the first sensor is acceptable;
  provide a notification to the first distillery customer to schedule participation in the second distillation operation responsive to the determination of the recommendation to proceed to the second distillation operation; and
  determine a location at the distillery at which to store at least the first customized spirit for the first distillery customer based on one or more of space available at the distillery, environmental conditions associated with the customized spirits, or length of storage.

19. The retail facility of claim 18, wherein the one or more first computing devices end are further programmed to:
 maintain, an electronic forum for sharing information related to producing spirits;
 receive, content for the electronic forum from at least one of the distillery customers, the content comprising one or more of:
  a recipe for producing customized spirits,
  a tweak to an action to be performed during production of the customized spirit,
  a photo,
  a video,
  multimedia content related to producing a customized spirit,
  a rating associated with an input provided during production of a customized spirit,
  a rating associated with a recipe for a type of spirit,
  a rating associated with a level of customization,
  a review associated with an input provided during production of a customized spirit,
  a review associated with a recipe for a type of spirit, or
  a review associated with a level of customization.

20. The retail facility of claim 18, wherein the plurality of distillation operations includes at least one of:
- selection of type of still equipment used,
- distillation,
- selection of batch or continuous distillation method,
- selection of number of times of distillation,
- selection of number of times of redistillation,
- selection of reflux ratio,
- selection of the number and types of plates used in a tower configuration,
- selection of the type of metal used in the still,
- condensation,
- head receipt,
- heart receipt, or
- tail receipt.

21. The retail facility of claim 18, wherein the backend computing device is further programmed to:
- process payment by the first distillery customer and/or one or more other distillery customers for the first customized spirit produced on behalf of the first distillery customer based on the first batch customization request.

\* \* \* \* \*

UNITED STATES PATENT AND TRADEMARK OFFICE
CERTIFICATE OF CORRECTION

Page 1 of 1

PATENT NO. : 10,755,329 B1
APPLICATION NO. : 13/750925
DATED : August 25, 2020
INVENTOR(S) : Justin B. Stiefel It is certified that error appears in the above-identified patent and that said Letters Patent is hereby corrected as shown below:

In the Claims

Column 46, Lines 11-12, (Claim 18), should read:
-- by a second recipe based on --.

Signed and Sealed this
Twentieth Day of October, 2020

Andrei Iancu
*Director of the United States Patent and Trademark Office*